(12) United States Patent
Petri et al.

(10) Patent No.: US 10,750,252 B2
(45) Date of Patent: *Aug. 18, 2020

(54) IDENTIFYING DEVICE STATE CHANGES USING POWER DATA AND NETWORK DATA

(71) Applicant: Sense Labs, Inc., Cambridge, MA (US)

(72) Inventors: Jonah Wyman Petri, Somerville, MA (US); Christopher M. Micali, Concord, MA (US); Michael S. Phillips, Belmont, MA (US)

(73) Assignee: Sense Labs, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,535

(22) Filed: Aug. 3, 2018

(65) Prior Publication Data

US 2018/0343507 A1 Nov. 29, 2018

Related U.S. Application Data

(63) Continuation-in-part of application No. 15/925,210, filed on Mar. 19, 2018, which is a continuation of
(Continued)

(51) Int. Cl.
*H04Q 9/00* (2006.01)

(52) U.S. Cl.
CPC ............ *H04Q 9/00* (2013.01); *H04Q 2209/60* (2013.01); *H04Q 2209/75* (2013.01); *H04Q 2209/823* (2013.01)

(58) Field of Classification Search
CPC ... H04Q 9/00; H04Q 2209/60; H04Q 2209/75
(Continued)

(56) References Cited

U.S. PATENT DOCUMENTS 5,945,993 A    8/1999   Fleischmann
6,311,105 B1   10/2001   Budike
(Continued)

FOREIGN PATENT DOCUMENTS

CN    101241367 A    8/2008
CN    102098323 A    6/2011
(Continued)

OTHER PUBLICATIONS

"Chapter 8. Remote OS Detection", Nmap Network Scanning, https://nmap.org/book/osdetect.html (accessed Mar. 13, 2017), 6 pages.
(Continued)

*Primary Examiner* — Ojiako K Nwugo
(74) *Attorney, Agent, or Firm* — GTC Law Group PC & Affiliates

(57) ABSTRACT

Devices state changes in a building may be determined using a combination of power monitoring and network monitoring. Power monitoring may be performed by obtaining a power monitoring signal and processing the power monitoring signal with models to determine information about state changes of one or more devices in the building. Network monitoring may be performed by receiving information about network packets transmitted by a device in the building and processing the information about the network packets to determine information about a different device or a state change of a different device in the building. For some devices and some implementations, information about state changes of a device may be determined by using both power monitoring and network monitoring.

23 Claims, 12 Drawing Sheets

Related U.S. Application Data application No. 15/599,466, filed on May 19, 2017, now Pat. No. 9,942,630, which is a continuation of application No. 15/439,788, filed on Feb. 22, 2017, now Pat. No. 9,699,529.

(58) Field of Classification Search
USPC .......................................... 340/870.19, 870.2
See application file for complete search history.

(56) References Cited

U.S. PATENT DOCUMENTS

| | | | |
|---|---|---|---|
| 7,085,814 B1 | 8/2006 | Gandhi et al. | |
| 7,353,182 B1 | 4/2008 | Missinhoun et al. | |
| 8,239,073 B2 | 8/2012 | Fausak et al. | |
| 8,674,823 B1* | 3/2014 | Contario | H02J 1/10 340/333 |
| 9,057,746 B1* | 6/2015 | Houlette | G06Q 50/06 |
| 9,152,737 B1 | 10/2015 | Micali et al. | |
| 9,172,623 B1 | 10/2015 | Micali et al. | |
| 9,429,599 B1 | 8/2016 | Contario et al. | |
| 9,443,195 B2 | 9/2016 | Micali et al. | |
| 9,691,030 B2 | 6/2017 | Micali et al. | |
| 9,699,529 B1 | 7/2017 | Petri et al. | |
| 9,739,813 B2 | 8/2017 | Houlette et al. | |
| 9,800,958 B1 | 10/2017 | Petri et al. | |
| 9,942,630 B1 | 4/2018 | Petri et al. | |
| 9,958,925 B2 | 5/2018 | Chapel et al. | |
| 10,001,792 B1 | 6/2018 | Packer et al. | |
| 10,175,276 B2 | 1/2019 | Fishburn et al. | |
| 10,338,112 B2 | 7/2019 | Micali et al. | |
| 2002/0178047 A1 | 11/2002 | Or et al. | |
| 2003/0216971 A1 | 11/2003 | Sick et al. | |
| 2004/0142662 A1* | 7/2004 | Ehrenberg | G08B 21/0202 455/66.1 |
| 2004/0255171 A1* | 12/2004 | Zimmer | G06F 1/3203 713/300 |
| 2005/0034023 A1 | 2/2005 | Maturana et al. | |
| 2005/0085973 A1 | 4/2005 | Furem et al. | |
| 2005/0108582 A1 | 5/2005 | Fung et al. | |
| 2006/0155514 A1* | 7/2006 | Drouart | G05B 23/0254 702/182 |
| 2006/0235574 A1* | 10/2006 | Lapinski | H02J 13/0079 700/286 |
| 2008/0306985 A1 | 12/2008 | Murray et al. | |
| 2009/0222360 A1 | 9/2009 | Schmitt et al. | |
| 2010/0211222 A1 | 8/2010 | Ghosn et al. | |
| 2010/0217550 A1 | 8/2010 | Crabtree et al. | |
| 2010/0332373 A1 | 12/2010 | Crabtree et al. | |
| 2011/0066300 A1 | 3/2011 | Tyagi et al. | |
| 2011/0245987 A1 | 10/2011 | Pratt et al. | |
| 2012/0022713 A1 | 1/2012 | Deaver et al. | |
| 2012/0065802 A1 | 3/2012 | Seeber et al. | |
| 2012/0181869 A1 | 7/2012 | Chapel et al. | |
| 2012/0197448 A1 | 8/2012 | Shin et al. | |
| 2012/0197560 A1 | 8/2012 | Kuhns et al. | |
| 2012/0221718 A1 | 8/2012 | Imes et al. | |
| 2012/0239773 A1 | 9/2012 | Blustein et al. | |
| 2012/0278272 A1 | 11/2012 | Kim et al. | |
| 2012/0280833 A1 | 11/2012 | Jonsson et al. | |
| 2012/0290230 A1 | 11/2012 | Berges Gonzalez et al. | |
| 2012/0290239 A1 | 11/2012 | Ku et al. | |
| 2013/0066479 A1 | 3/2013 | Shetty et al. | |
| 2013/0132009 A1 | 5/2013 | Rolia et al. | |
| 2013/0241746 A1 | 9/2013 | McKinley et al. | |
| 2013/0262197 A1 | 10/2013 | Kaulgud et al. | |
| 2013/0268357 A1 | 10/2013 | Heath et al. | |
| 2014/0052304 A1 | 2/2014 | Vuppala et al. | |
| 2014/0188565 A1 | 7/2014 | Dantressangle et al. | |
| 2014/0207255 A1 | 7/2014 | Tandon et al. | |
| 2014/0266784 A1 | 9/2014 | Ratcliff | |
| 2014/0278241 A1 | 9/2014 | Jiang et al. | |
| 2014/0303796 A1 | 10/2014 | Jeong et al. | |
| 2015/0012147 A1 | 1/2015 | Haghighat-Kashani et al. | |
| 2015/0094968 A1* | 4/2015 | Jia | G06Q 40/04 702/60 |
| 2015/0112906 A1 | 4/2015 | Gauthier et al. | |
| 2015/0127185 A1 | 5/2015 | Behrangrad | |
| 2015/0142695 A1 | 5/2015 | He et al. | |
| 2015/0149128 A1 | 5/2015 | Baone et al. | |
| 2015/0161020 A1 | 6/2015 | Matsuoka et al. | |
| 2015/0204558 A1 | 7/2015 | Sartain et al. | |
| 2015/0244121 A1 | 8/2015 | Amelio et al. | |
| 2015/0261944 A1* | 9/2015 | Hosom | G06F 21/32 726/19 |
| 2015/0271557 A1 | 9/2015 | Tabe | |
| 2015/0271575 A1 | 9/2015 | Asao et al. | |
| 2015/0324696 A1 | 11/2015 | Hirschbold et al. | |
| 2016/0093297 A1* | 3/2016 | Deisher | G10L 15/285 704/236 |
| 2016/0132772 A1 | 5/2016 | Little | |
| 2016/0139575 A1 | 5/2016 | Funes | |
| 2016/0146866 A1 | 5/2016 | Houlette et al. | |
| 2016/0147243 A1 | 5/2016 | Micali et al. | |
| 2016/0148099 A1 | 5/2016 | Micali et al. | |
| 2016/0195864 A1 | 7/2016 | Kim | |
| 2016/0313744 A1 | 10/2016 | Amelio et al. | |
| 2016/0328651 A1 | 11/2016 | Micali et al. | |
| 2017/0045560 A1 | 2/2017 | Rice | |
| 2017/0086143 A1* | 3/2017 | Pike | H04W 52/50 |
| 2017/0176502 A1* | 6/2017 | Saneyoshi | G01R 21/06 |
| 2017/0176503 A1* | 6/2017 | Saneyoshi | G01R 21/133 |
| 2017/0192042 A1 | 7/2017 | Micali et al. | |
| 2018/0196094 A1 | 7/2018 | Fishburn et al. | |
| 2018/0238933 A1 | 8/2018 | Lachman et al. | |
| 2018/0242056 A1 | 8/2018 | Petri et al. | |

FOREIGN PATENT DOCUMENTS

| | | |
|---|---|---|
| CN | 102314547 A | 1/2012 |
| CN | 102549521 A | 7/2012 |
| CN | 102822639 A | 12/2012 |
| CN | 105119882 A | 12/2015 |
| JP | 2012016270 A | 1/2012 |
| KR | 1020100111170 A | 10/2010 |
| KR | 101448683 B1 | 10/2014 |
| WO | 2013106923 A1 | 7/2013 |
| WO | 2015073997 A2 | 5/2015 |
| WO | 2016085500 A1 | 6/2016 |
| WO | 2016085942 A1 | 6/2016 |
| WO | 2018156546 A1 | 8/2018 |

OTHER PUBLICATIONS

"DC Electric Power", http://hyperphysics.phy-astr.gsu.edu/hbase/electric/elepow.html, (accessed on Aug. 5, 2016), 1 Page.

"Host Discovery, Chapter 15. Nmap Reference Guide", Nmap Network Scanning, https://nmap.org/book/man-host-discovery.html (accessed Mar. 13, 2017), 9 pages.

"Simple Service Discovery Protocol", Wikipedia, https://en.wikipedia.org/wiki/Simple_Service_Discovery_Protocol (accessed on Mar. 13, 2017), 3 pages.

14906856.1, "European Application Serial No. 14906856.1, Extended European Search Report dated Mar. 16, 2018", Sense Labs, Inc., 8 pages.

15863620.9, "European Application Serial No. 15863620.9, Extended European Search Report dated Oct. 17, 2018", Sense Labs, Inc., 5 pages.

Alles, et al., "A Commercial Disaggregation System for Residential and Light Commercial Buildings", Presented on Jun. 3, 2014 at the NILM Workshop 2014, University of Texas at Austin, http://nilmworkshop14.files.wordpress.com/2014/05/alles_commercial.pdf, accessed on Dec. 22, 2014, 4 pages.

Anderson, et al., "Unsupervised Approximate Power Trace Decomposition Algorithm", Presented on Jun. 3, 2014 at the NILM Workshop 2014, University of Texas at Austin, http://nilmworkshop14.files.wordpress.com/2014/05/anderson_unsupervised.pdf, accessed on Dec. 22, 2014, 4 pages.

Armel, et al., "Is Disaggregation the Holy Grail of Energy Efficiency? The Case of Electricity", Precourt Energy Efficiency Center Tech-

(56) References Cited

OTHER PUBLICATIONS nical Paper Series: PTP-2012-05-1, Stanford University, http://web.stanford.edu/group/peec/cgi-pin/docs/behavior/research/disaggregation-armel.pdf accpt./publ. in: Energy Policy, 2013, vol. 52, issue C, pp. 213-234, May 1, 2012, 50 pages.
Barker, et al., "NILM Redux: The Case for Emphasizing Applications over Accuracy", Presented on Jun. 3, 2014 at the NILM Workshop 2014, University of Texas at Austin, http://nilmworkshop14.files.wordpress.com/2014/05/parker_nilm.pdf , accessed on Dec. 22, 2014, 4 pages.
Barsim, et al., "An Approach for Unsupervised Non-Intrusive Load Monitoring of Residential Appliances", Presented on Jun. 3, 2014 at the NILM Workshop 2014, University of Texas at Austin, http://nilmworkshop14.files.wordpress.com/2014/05/barsim_approach.pdf , accessed on Dec. 22, 2014, 5 pages.
Batra, et al., "NILMTK: An Open Source Toolkit for Non-intrusive Load Monitoring", Presented on Jun. 3, 2014 at the NILM Workshop 2014, University of Texas at Austin, http://nilmworkshop14.files.wordpress.com/2014/05/batra_nilmtk.pdf , accessed on Dec. 22, 2014, 4 pages.
Bilski, et al., "Analysis of the artificial intelligence methods applicability to the non-intrusive load monitoring", Presented on Jun. 3, 2014 at the NILM Workshop 2014, University of Texas at Austin, http://nilmworkshop14.files.wordpress.com/2014/05/bilski_analysis.pdf , accessed on Dec. 22, 2014, 4 pages.
Brown, et al., "Using Wireless Power Meters to Measure Energy Use of Miscellaneous and Electronic Devices in Buildings", Proceedings of the Energy Efficiency in Domestic Appliances and Lighting (EEDAL) 20001 Conference, Copenhagen, Denmark, May 24-26, 2011, 14 Pages.
Cheshire et al., "Multicast DNS", Internet Engineering Task Force (IETF), Request for Comments: 6762, Category: Standards Track, ISSN: 2070-1721, Apple, Inc., https://tools.ietf.org/html/rfc6762 (accessed Mar. 13, 2017), Feb. 2013, 140 pages.
Cheshire, "Zero Configuration Networking (Zeroconf)", http://www.zeroconf.org/ (accessed Mar. 13, 2017), 4 pages.
Dong, et al., "Energy Disaggregation via Adaptive Filtering", Presented on Jun. 3, 2014 at the NILM Workshop 2014, University of Texas at Austin, http://nilmworkshop14.files.wordpress.com/2014/05/dong_energy.pdf , accessed on Dec. 22, 2014, 4 pages.
Figueuredo, et al., "On the Optimization of Appliance Loads Inferred by Probabilistic Models", Presented on Jun. 3, 2014 at the NILM Workshop 2014, University of Texas at Austin, http://nilmworkshop14.files.wordpress.com/2014/05/figueiredo_optimization.pdf , accessed on Dec. 22, 2014, 4 pages.
Froehlich, et al., "Disaggregated End-Use Energy Sensing for the Smart Grid", Pervasive Computing, IEEE, vol. 10, iss. 1, Jan.-Mar. 2011, pp. 28-39.
Goland, et al., "Simple Service Discovery Protocol/1.0, Operating without an Arbiter, <draft-cai-ssdp-v1-03.txt>", Internet Engineering Task Force, Internet Draft, Microsoft Corporation, Shivaun Albright, Hewlett-Packard Company, https://tools.ietf.org/html/draft-cai-ssdp-v1-03, (accessed on Mar. 13, 2017), Oct. 28, 1999, 36 pages.
Holmegaard, et al., "Towards Automatic Identification of Activity Modes in Electricity Consumption Data for Small and Medium Sized Enterprises", Presented on Jun. 3, 2014 at the NILM Workshop 2014, University of Texas at Austin, http://nilmworkshop14.files.wordpress.com/2014/05/holmegaard_towards.pdf, accessed on Dec. 22, 2014, 4 pages.
Jacquemod, et al., "Innovating current sensor for NILM application", Presented on Jun. 3, 2014 at the NILM Workshop 2014, University of Texas at Austin, http://nilmworkshop14.files.wordpress.com/2014/05/acquemod_innovating.pdf , accessed Dec. 22, 2014, 4 pages.
Kelly, et al., "Metadata for Energy Disaggregation", Presented on Jun. 3, 2014 at the NILM Workshop 2014, University of Texas at Austin, http://nilmworkshop14.files.wordpress.com/2014/05/kelly_metadata.pdf , accessed on Dec. 22, 2014, 4 pages.

Li, et al., "Energy Disaggregation via Hierarchical Factorial HMM", Presented on Jun. 3, 2014 at the NILM Workshop 2014, University of Texas at Austin, http://nilmworkshop14.files.wordpress.com/2014/05/li_energy.pdf , accessed on Dec. 22, 2014, 4 pages.
Liao, et al., "Power Disaggregation for Low-sampling Rate Data", Presented on Jun. 3, 2014 at the NILM Workshop 2014, University of Texas at Austin, http://nilmworkshop14.files.wordpress.com/2014/05/liao_power.pdf , accessed on Dec. 22, 2014, 4 pages.
Maasoumy, et al., "Handling model uncertainty in model predictive control for energy efficient buildings", Energy and Building, vol. 77, Apr. 1, 2014 (online), pp. 377-392.
Makonin, et al., "Efficient Sparse Matrix Processing for Nonintrusive Load Monitoring (NILM)", Presented on Jun. 3, 2014 at the NILM Workshop 2014, University of Texas at Austin, http://nilmworkshop14.files.wordpress.com/2014/05/makonin_efficient.pdf , accessed on Dec. 22, 2014, 4 pages.
PCT/US18/18897, "International Application Serial No. PCT/US18/18897, International Search Report and Written Opinion dated Mar. 16, 2018", Sense Labs, Inc., 8 Pages.
PCT/US2014/067662, "International Application Serial No. PCT/US2014/067662, International Preliminary Report on Patentability and Written Opinion dated Jun. 8, 2017", Sense Labs, Inc., 10 Pages.
PCT/US2014/067662, "International Application Serial No.PCT/US2014/067662, International Search Report and Written Opinion dated Aug. 12, 2015", Sense Labs, Inc., 13 pages.
PCT/US2015/062346, "International Application Serial No. PCT/US2015/062346 International Search Report and Written Opinion dated Feb. 29, 2016", Sense Labs, Inc., 14 pages.
PCT/US2015/062346, "International Application Serial No. PCT/US2015/062346, International Preliminary Report on Patentability and Written Opinion dated Jun. 8, 2017", Sense Labs, Inc., 11 Pages.
Perez, et al., "Nonintrusive Disaggregation of Residential Air-Conditioning Loads from Sub-hourly Smart Meter Data", Presented on Jun. 3, 2014 at the NILM Workshop 2014, University of Texas at Austin, http://nilmworkshop14.files.wordpress.com/2014/05/perez_nonintrusive1.pdf , accessed on Dec. 22, 2014, 4 pages.
Tang, et al., "Semi-Intrusive Load Monitoring for Large-Scale Appliances", Presented on Jun. 3, 2014 at the NILM Workshop 2014, University of Texas at Austin, http://nilmworkshop14.files.wordpress.com/2014/05/tang_semiintrusive.pdf , accessed on Dec. 22, 2014, 4 pages.
Trung, et al., "Event Detection and Disaggregation Algorithms for NIALM System", Presented on Jun. 3, 2014 at the NILM Workshop 2014, University of Texas at Austin, http://nilmworkshop14.files.wordpress.com/2014/05/trung_event.pdf , accessed on Dec. 22, 2014, 4 pages.
Tyler, et al., "Direct, Instantanious Identification of Home Appliances", Presented on Jun. 3, 2014 at the NILM Workshop 2014, University of Texas at Austin, http://nilmworkshop14.files.wordpress.com/2014/05/tyler_direct.pdf , accessed on Dec. 22, 2014, 4 pages.
Zalewski, "p0f v3 (version 3.09b)", http://lcamtuf.coredump.cx/p0f3/ (accessed on Mar. 13, 2017), copyright 2012-2014, 4 pages.
Anonymous, "Smart meter", Wikipedia, Retrieved from the Internet: URL:https://en.wikipedia.org/w/index.php?title=Smart_meter&oldid=634667241 [retrieved on Oct. 8, 2019], 2014, 18 pages.
Jazizadeh, et al., "An unsupervised hierarchical clustering based heuristic algorithm for facilitated training of electricity consumption disaggregation systems", Advanced Engineering Informatics 28.4, 2014, pp. 311-326.
Makonin, et al., "The cognitive power meter: Looking beyond the smart meter", 2013 26th IEEE Canadian Conference on Electrical and Computer Engineering (CCECE). IEEE, 2013, pp. 1-5.
PCT/US18/18897, "International Application Serial No. PCT/US18/18897, International Preliminary Report on Patentability dated Sep. 6, 2019", Sense Labs, Inc., 5 pages.
PCT/US19/54062, "International Application Serial No. PCT/US19/54062, International Search Report and Written Opinion dated Jan. 2, 2020", Sense Labs, Inc., 15 pages.

(56) References Cited

OTHER PUBLICATIONS

Phillips, et al., "Supero: A sensor system for unsupervised residential power usage monitoring", 2013 IEEE International Conference on Pervasive Computing and Communications (PerCom). IEEE, 2013, pp. 66-75.
Zeifman, "Disaggregation of home energy display data using probabilistic approach", IEEE Transactions on consumer Electronics 58.1, 2012, pp. 23-31.
PCT/US19/54602, Oct. 1, 2019, Pending, Ghinwa Fakhri Choueiter et al.

\* cited by examiner

| Device ID | Name | Type | Make | Version | Power Model | Network ID | Network Model | State |
|---|---|---|---|---|---|---|---|---|
| 1001 | Dishwasher | Dishwasher | Kenmore | 1000 | Dishwasher-139 | None | None | On |
| 1002 | John's tablet | Tablet | Samsung | Galaxy | None | 192.168.0.1 | Android-1621 | Off |
| 1003 | Living room TV | TV | Toshiba | Regza | TV-894 | 192.168.0.2 | TV-1384 | Sleep |
| ... | | | | | | | | |

IDENTIFYING DEVICE STATE CHANGES USING POWER DATA AND NETWORK DATA

CROSS-REFERENCE TO RELATED APPLICATION

This application is a continuation-in-part of U.S. patent application Ser. No. 15/925,210 (SAGE-0003-U01-C01-C01), filed Mar. 19, 2018 and entitled "IDENTIFYING DEVICE STATE CHANGES USING POWER DATA AND NETWORK DATA", which is a continuation of U.S. patent application Ser. No. 15/599,466 (SAGE-0003-U01-C01), filed May 19, 2017 and entitled "IDENTIFYING DEVICES USING POWER DATA AND NETWORK DATA", now issued as U.S. Pat. No. 9,942,630 on Apr. 10, 2018, which is a continuation of U.S. patent application Ser. No. 15/439,788 (SAGE-0003-U01) filed Feb. 22, 2017 and entitled "IDENTIFYING DEVICE STATE CHANGES USING POWER DATA AND NETWORK DATA", now issued as U.S. Pat. No. 9,699,529 on Jul. 4, 2017.

The above applications are hereby incorporated by reference in their entireties.

BACKGROUND

Reducing electricity or power usage provides the benefits, among others, of saving money by lowering payments to electric companies and also protecting the environment by reducing the amount of resources needed to generate the electricity. Electricity users, such as consumers, businesses, and other entities, may thus desire to reduce their electrical usage to achieve these benefits. Users may be able to more effectively reduce their electricity usage if they have information about what devices (e.g., refrigerator, oven, dishwasher, furnace, and light bulbs) in their homes and buildings are using the most electricity and what actions are available to reduce electricity usage.

Power monitors for individual devices are available for measuring the power usage of a single device. For example, a device can be plugged into a power monitor, and the monitor can in turn be plugged into a wall outlet. These monitors can provide information about power usage for the one device they are attached to, but it may not be practical to monitor all or even many devices in a house or building with these monitors, because it would require a large number of devices that can be expensive and also require significant manual effort to install.

Instead of a power monitor for a single device, a power monitor can be installed at an electrical panel to obtain information about electricity used by many devices simultaneously. A power monitor on an electrical panel is more convenient because a single monitor can provide aggregate usage information about many devices. It is more difficult, however, to extract more specific information about usage of power by a single device, since the monitor typically measures signals that reflect the collective operation of many devices, which may overlap in complex ways. The process of obtaining information about the power usage of a single device from an electrical signal corresponding to usage by many devices may be referred to as disaggregation.

To provide the greatest benefits to end users, a need exists for more accurate disaggregation techniques, so that end users receive accurate information about the electrical usage of individual devices.

BRIEF DESCRIPTION OF THE FIGURES

The invention and the following detailed description of certain embodiments thereof may be understood by reference to the following figures.

DETAILED DESCRIPTION

Figure 1:
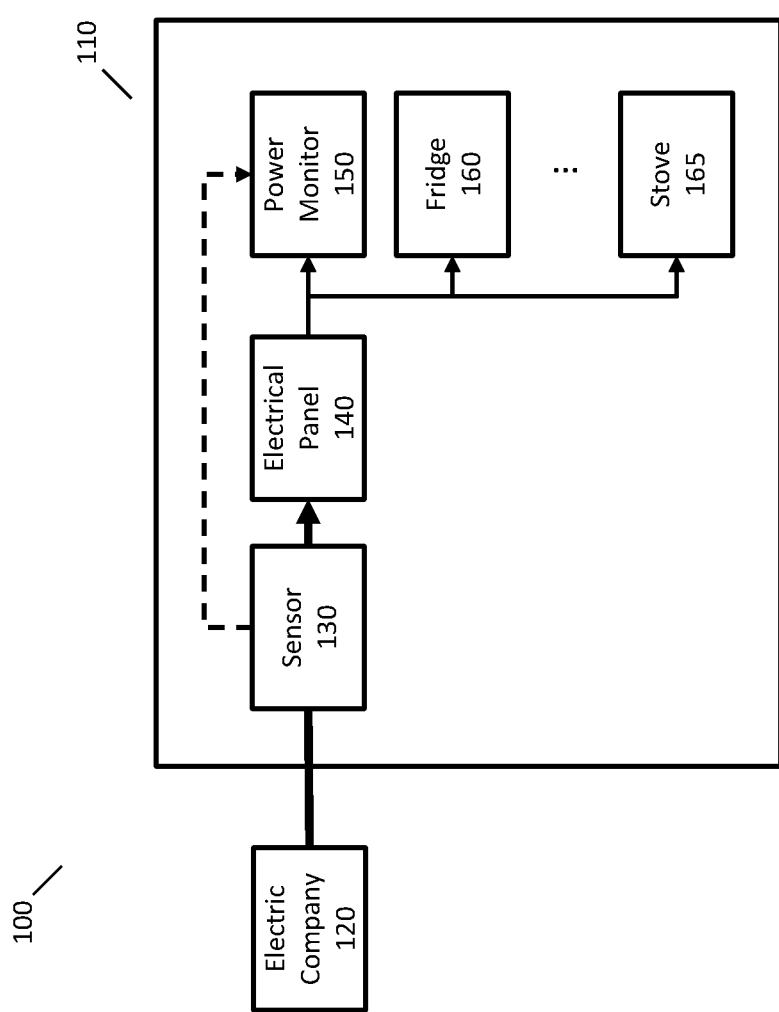
FIG. 1 is an example of a system for identifying devices and state changes of devices using a power monitoring signal.

Described herein are techniques for identifying devices and determining information about state changes of devices in a building. One source of data in determining information about devices in a building is the electrical line that provides power to the devices in the building. Electrical sensors may be placed on the electrical line (or lines) that are providing power to the building, and disaggregation techniques may be used to determine information about individual devices in the building. For example, any of the techniques described in U.S. Pat. No. 9,443,195, which is hereby incorporated by reference in its entirety for all purposes, may be used to determine information about devices using electrical measurements.

Another source of data for identifying devices or determining information about device state changes in a building is a computer network in the building. A building may have a network, such as a local area network, and devices may connect to the network via a wire (e.g., an Ethernet cable) or wirelessly (e.g., Wi-Fi). A building may have multiple networks, such as local area network coordinated by a wireless router, a mesh network created by other devices working in cooperation (e.g., Sonos speakers), and a personal area network (e.g., a Bluetooth connection between devices). Information about devices on these networks may be obtained, for example by receiving a service broadcast from a device after it is turned on or by polling a device for information.

Some devices may be powered by the electrical line in the building but may not have a network connection (e.g., a conventional refrigerator). Some devices may be powered by the electrical line in the building and have a network connection (e.g., a "smart" refrigerator). Some devices may have a network connection but may not by powered by the electrical line (e.g., mobile devices, such as smartphones) or may only sometimes be powered by the electrical line (e.g., when charging). The techniques described herein may provide more information and/or more accurate information about devices in the building by using a combination of information from the electrical line and information from a network in the building.

The information from the electrical line and from the network in the building may be used to provide a service to users to inform them about the status of devices in the building. A company may provide a power monitoring device that may be installed in the building and connected to both the power line and the computer network of the building. The power monitoring device may use both the electrical line and network data to determine information about what devices are present in the building and also the states of the devices (e.g., on or off). This information may then be made available to the user, such as by presenting it in a specialized app (e.g., on a smartphone) or a web page. The service may provide the user with information about devices in the building, such as real-time information about the states of devices, real-time power usage by devices, and historical information about device activity.

For clarity of presentation, the techniques described herein will use a house or home as an example of a building where the techniques may be applied, but the techniques described herein are equally applicable to any environment where electricity is used, including but not limited to businesses and commercial buildings, government buildings, and other venues. References to homes throughout should be understood to encompass such other venues.

Power Monitoring

FIG. 1 illustrates an example of a system 100 where information obtained from an electrical line may be used to determine information about devices in a home. In FIG. 1, electric company 120 provides electrical power to home 110. The electrical power is transmitted to an electrical panel 140 where it may then be distributed to different electrical circuits in the house.

Electrical panel 140 may be any electrical panel that may be found in a building. For example, electrical panel 140 may implement split-phase electric power, where a 240 volt AC electrical signal is converted with a split-phase transformer to a three-wire distribution with a single ground and two mains (or legs) that each provide 120 volts. Some devices in the house may use one of the two mains to obtain 120 volts; other devices in the house may use the other main to obtain 120 volts; and yet other devices may use both mains simultaneously to obtain 240 volts.

Any type of electrical panel may be used, and the techniques described herein are not limited to a split phase electrical panel. For example, electrical panel 140 may be single phase, two phase, or three phase. The techniques are also not limited to the number of mains provided by electrical panel 140. In the discussion below, electrical panel 140 will be described as having two mains, but any number of mains may be used, including just a single main. Other voltage standards, such as for other countries or continents, are intended to be encompassed herein as would be understood by one of ordinary skill in the art.

FIG. 1 illustrates devices that are consuming electricity provided by electrical panel 140. For example, power monitor 150, refrigerator 160, and stove 165 may consume electricity provided via electrical panel 140.

Power monitor 150 may be connected to sensor 130 to measure electrical properties of the electrical line connected to house 110. For example, sensor 130 may measure voltage and/or current levels for electrical lines providing electricity to electrical panel 140. The measurements may be obtained using any available sensors, and the techniques are not limited to any particular sensors or any particular types of values that may be obtained from sensors. Sensor 130 may comprise multiple sensors, such as one or more sensors for each main.

Sensor 130 may provide one or more power monitoring signals to power monitor 150, such as a measurement of current and/or voltage for each main connected to electrical panel 140. Power monitor 150 may process the power monitoring signals to disaggregate them or to obtain information about individual devices in the home. For example, power monitor 150 may determine state changes of devices, such as the television was turned on at 8:30 pm or the compressor of the refrigerator started at 10:35 am and 11:01 am.

Power monitor 150 may be a device that is obtained separately from electrical panel 140 and installed by a user or electrician to connect to electrical panel 140. Power monitor 150 may be part of electrical panel 140 and installed by the manufacturer of electrical panel 140. Power monitor 150 may also be part of (e.g., integrated with or into) an electrical meter, such as one provided by the electric company, and sometimes referred to as a smart meter.

Power monitor 150 may use any appropriate techniques for performing disaggregation or determining information about the power usage or state of individual devices from the power monitoring signal. For example, power monitor 150 may use any of the techniques described in U.S. Pat. No. 9,443,195.

Figure 2:
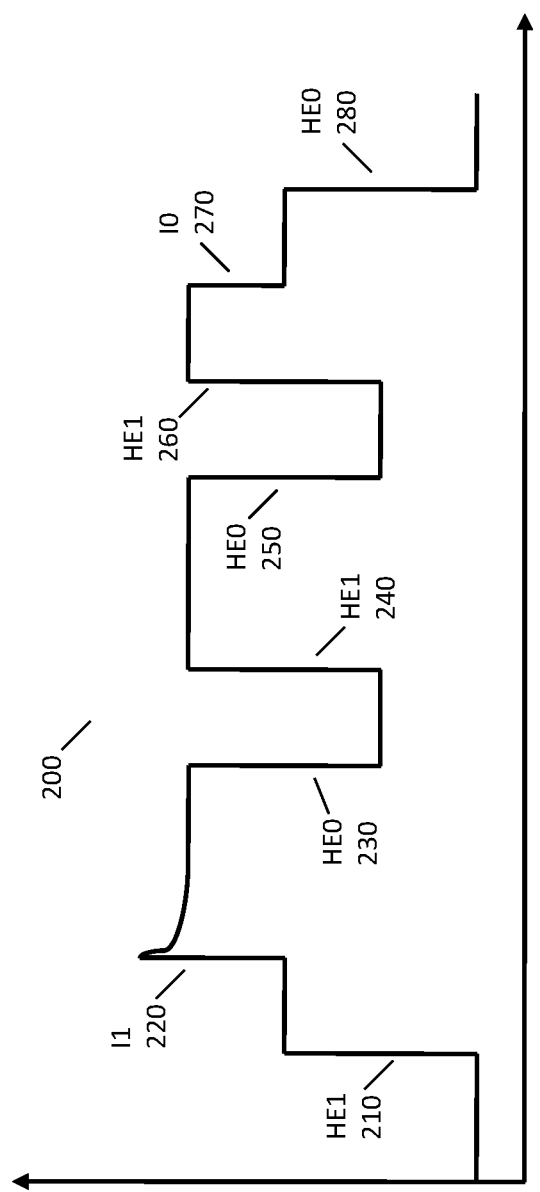
FIG. 2 is an example of a power monitoring signal.

FIG. 2 illustrates an example of a hypothetical power monitoring signal 200 that may be processed by power monitor 150. FIG. 2 illustrates changes to the power monitoring signal caused by state changes of two devices, a stove and an incandescent light bulb. Each of the changes in the power signal may be referred to as a power event. In FIG. 2, the power events labelled with HE1 correspond to a heating element of the burner of a stove being turned on and the power events labelled with HE0 correspond to a heating element of the burner being turned off (for electric stoves, the burner may appear to be on to the user, but the stove may cause the heating element to turn on and off on a periodic basis to maintain a desired temperature). The power event labelled with I1 corresponds to an incandescent light bulb being turned on and the power event labelled I0 corresponds to the incandescent light bulb being turned off.

At power event 210, a burner of a stove is turned on and the heating element of the burner consumes electricity. Accordingly, the power usage increases in the power monitoring signal. While the heating element is on, at power event 220, the incandescent light bulb is turned on to further increase the power usage. At power events 230, 240, 250, and 260, the heating element is turned off, then on, then off, and then on again. At power event 270, the incandescent light bulb is turned off, and at power event 280, the burner of the stove is turned off and the heating element stops consuming electricity.

Power monitor 150 may process the power monitoring signal 200 to identify devices and/or determine state changes of devices. Some state changes may correspond to a person turning on or off the device and some state changes may correspond to change in the functioning of a device (e.g., cycling of a heating element or washing machine changing from wash mode to a spin mode). Power monitor 150 may use any appropriate techniques for identifying devices and determining state changes of devices, such as any of the techniques described in U.S. Pat. No. 9,443,195.

In some implementations, power monitor 150 may process a power monitoring signal with mathematical models to identify devices and determine state changes of devices. Such models will be referred to as power models. For example, power monitor 150 may have power models for different types of devices (e.g., stove, dishwasher, refrigerator, etc.), different makes of devices (e.g., Kenmore dishwasher, Maytag dishwasher, etc.), different versions of devices (e.g., Kenmore 1000 dishwasher), and specific devices (e.g., the dishwasher at 100 Main St.). Power monitor 150 may also have power models for particular state changes, such as a device turning on, a device turning off, or a device changing operation in another way (a water pump of a dishwasher turning on or off). In common usage, the "1000" in a Kenmore 1000 dishwasher may be referred to as a "model" of the dishwasher, but to avoid confusion with mathematical models, the "model" of a dishwasher will instead be referred to herein as a "version."

When processing the power monitoring signal with a power model, such as any of the power models referred to above, the power model may generate a score (e.g., a probability, likelihood, confidence, etc.) indicating a match between the power model and the power monitoring signal. When a power event occurs in the power monitoring signal (such as any of the events in FIG. 2), a portion of the power monitoring signal that includes the power event may be processed by a variety of power models, and a score may be generated by each of the power models. The power model scores may be used to identify devices in the home and/or determine state changes of devices in the home.

In some implementations, power monitoring signal processing may proceed as follows. The power monitoring signal may be continuously processed to identify power events in the power monitoring signal. Where the power monitoring signal has a steady value or minor fluctuations, there may not be any device state changes in the house. A power event detection component may detect changes in the electrical signal that likely correspond to device state changes and cause these portions of the power monitoring signal to be further processed. A power event detection component may be implemented using any appropriate techniques, such as a classifier.

After a power event is detected, a feature generation component may be used to generate features from the portion of the power monitoring signal that includes the power event. Any appropriate features may be computed, such as any of the features described in U.S. Pat. No. 9,443,195.

The features may then be processed by one or more power models to identify a device or determine a device state change corresponding to the power event. Any appropriate power models may be used, such as the transition models, device models, wattage models, and prior models described in U.S. Pat. No. 9,443,195. For example, each power model may generate a score, and the device state change may be determined by selecting the power model with the highest score.

Techniques for identifying devices in a home using power models are now described. In some implementations, power monitor 150 may be installed with an initial set of power models corresponding to devices that are likely in the house. As the power monitoring signal is processed, scores may be generated for power events that occur in the power monitoring signal using the power models. These scores may be used to identify what devices are in the house.

In some implementations, power monitor 150 may identify a device as being in the house if a score generated by a power model exceeds a threshold. For example, a dishwasher model may generate a score that exceeds a threshold when a dishwasher model processes a portion of the power monitoring signal corresponding to the dishwasher being started. The threshold may be specific to the dishwasher model or the threshold may be the same for all power models. In some implementations, a confidence level may be computed in addition to or instead of the score, and a device will be identified when the confidence level exceeds a threshold.

In some implementations, additional criteria may be considered before identifying a device. For example, power monitor 150 may have multiple dishwasher power models corresponding to different types of dishwashers (e.g., regular dishwashers and energy efficient dishwashers) or there may be power models for different makes of dishwashers. When processing the power monitoring signal corresponding to the dishwasher starting, multiple dishwasher models may produce a score (or confidence level) that exceeds the threshold. Instead of identifying multiple dishwashers, a single dishwasher may be identified corresponding to the highest scoring model that exceeds the threshold. For example, power monitor 150 may have a power model for Kenmore dishwashers and Bosch dishwashers. Each model may generate a score that exceeds the threshold, but the score of the Kenmore model may be higher than the score for the Bosch model. Accordingly, a Kenmore dishwasher may be identified.

In some implementations, power monitor 150 may be updated with additional power models after a device has been identified. For example, after it has been determined that the house has a dishwasher, power models may be added to power monitor 150 corresponding to the most common makes of dishwashers. The power monitoring signal may then be processed with the power models for different makes of dishwashers, and a highest scoring power model may be used to identify the make of the dishwasher in the house. This process may be repeated to determine additional information, such as a version of the dishwasher (e.g., Kenmore 1000 dishwasher).

After devices in the house have been identified, power monitor 150 may process the power monitoring signal to determine state changes of the identified devices. In addition to having power models for particular devices, power monitor 150 may also have models for particular state changes of devices, and these models may be used to determine when a device changes state.

As described above, power models for state changes of devices may be used to process a power monitoring signal to generate scores for the possible state changes. Where a score (or confidence level) exceeds a threshold, power monitor 150 may determine that the state change corresponding to the model has occurred. For example, power monitor 150 may have power models for the dishwasher starting operation and finishing operation. When the power model for the dishwasher starting generates a score that exceeds a threshold, power monitor 150 may determine that the dishwasher has started. Similarly, when the power model for the dishwasher ending generates a score that exceeds a threshold, power monitor 150 may determine that the dishwasher has finished its cycle.

The power models for determining state changes need not be the same as the power models for identifying devices, and the thresholds used for determining state changes need not be the same as the thresholds used for identifying devices. The models and thresholds may be adjusted to obtain desired tradeoffs for accuracy and error rates.

Aspects of the operations described above for identifying devices and determining state changes of devices may be performed by other computers instead of power monitor 150 (e.g., a server computer operating in conjunction with a power monitor). For example, in some implementations, power monitor 150 may provide a power monitoring signal to another computer (e.g., a server) and the other computer may identify devices and state changes. In some implementations, the other computer may identify devices, and power monitor 150 may determine state changes of devices.

Network Monitoring

In some implementations, power monitor 150 may be connected to a computer network in the house. For example, power monitor 150 may have a wired connection to a router in the house (e.g., LAN Ethernet), may have a wireless connection to a network (e.g., Wi-Fi), or may have direct network connections with other devices (e.g., Bluetooth). In these implementations, power monitor 150 is also a network monitor, but for clarity of presentation, the following description will continue to use the term power monitor.

Figure 3:
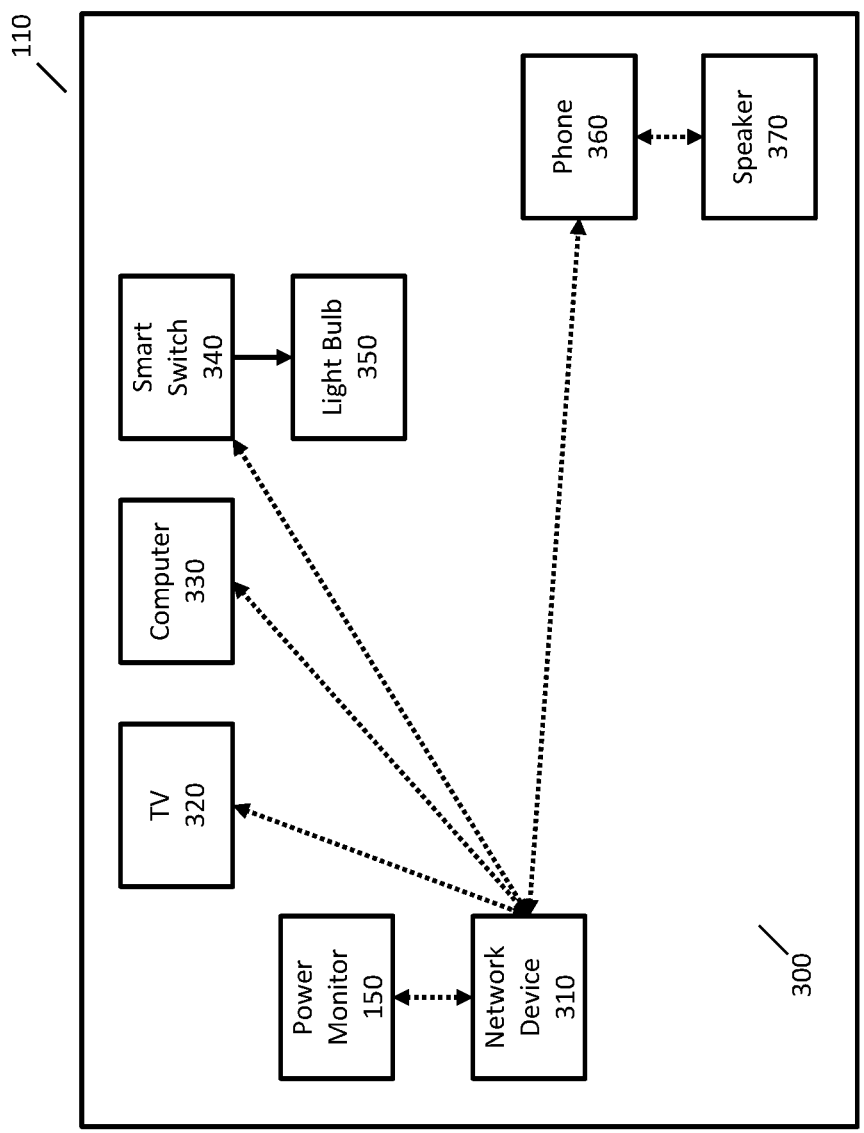
FIG. 3 is an example of a system for identifying devices and state changes of devices using network data.

FIG. 3 illustrates an example system 300 where power monitor 150 is connected to a network in the house. In this example, power monitor 150 has a network connection with network device 310, which may be any device that facilitates a network in the house, such as a modem, router, or hub. Other devices in the house may also be connected to network device 310. For example, a television 320 (e.g., a smart television), computer 330 (e.g., a personal computer), smart switch 340 (e.g., a Phillips Hue or Belkin Wemo switch), and a phone 360 (e.g., an Android phone or iPhone) may also be connected to the home network. Power monitor 150 may connect to other devices in the house using any appropriate wired or wireless network configuration, such as LAN Ethernet or direct connections with other devices. In some implementations, power monitor 150 may communicate on multiple networks simultaneously (e.g., a Wi-Fi connection to a home router and a Bluetooth connection to a specific device).

Power monitor 150 may learn about devices in the house using data transmitted over the computer network. For example, power monitor 150 may listen for broadcast messages from other devices, may poll other devices, or may listen for network data generated by other devices. In some implementations, power monitor 150 may learn about other devices in the house indirectly via networks outside of the house. For example, a device in the house may transmit information to a third-party server that operates in conjunction with that device, and the third-party server may transmit information to a server that operates in conjunction with power monitor 150. Each of these techniques may be used to identify devices in the house and determine state changes of the devices (e.g., that the device is on or off).

In some implementations, a device in the house may transmit data that includes information about the device itself (e.g., a broadcast message or response to poll). For example, a network transmission may include any of the following: a state (e.g., device just turned on or will be turning off), services offered by the device, a user assigned name (e.g., "John's Mac"), a make, a hardware version, a software version, a network address (e.g., an IP address), an identification number (e.g., a MAC address, a device serial number, a universally unique identifier, a globally unique identifier, or a temporary identifier), or other information (e.g., protocol-specific identification (such as a Zeroconf service name) or a resource locator used with the SSDP protocol).

Figure 4:
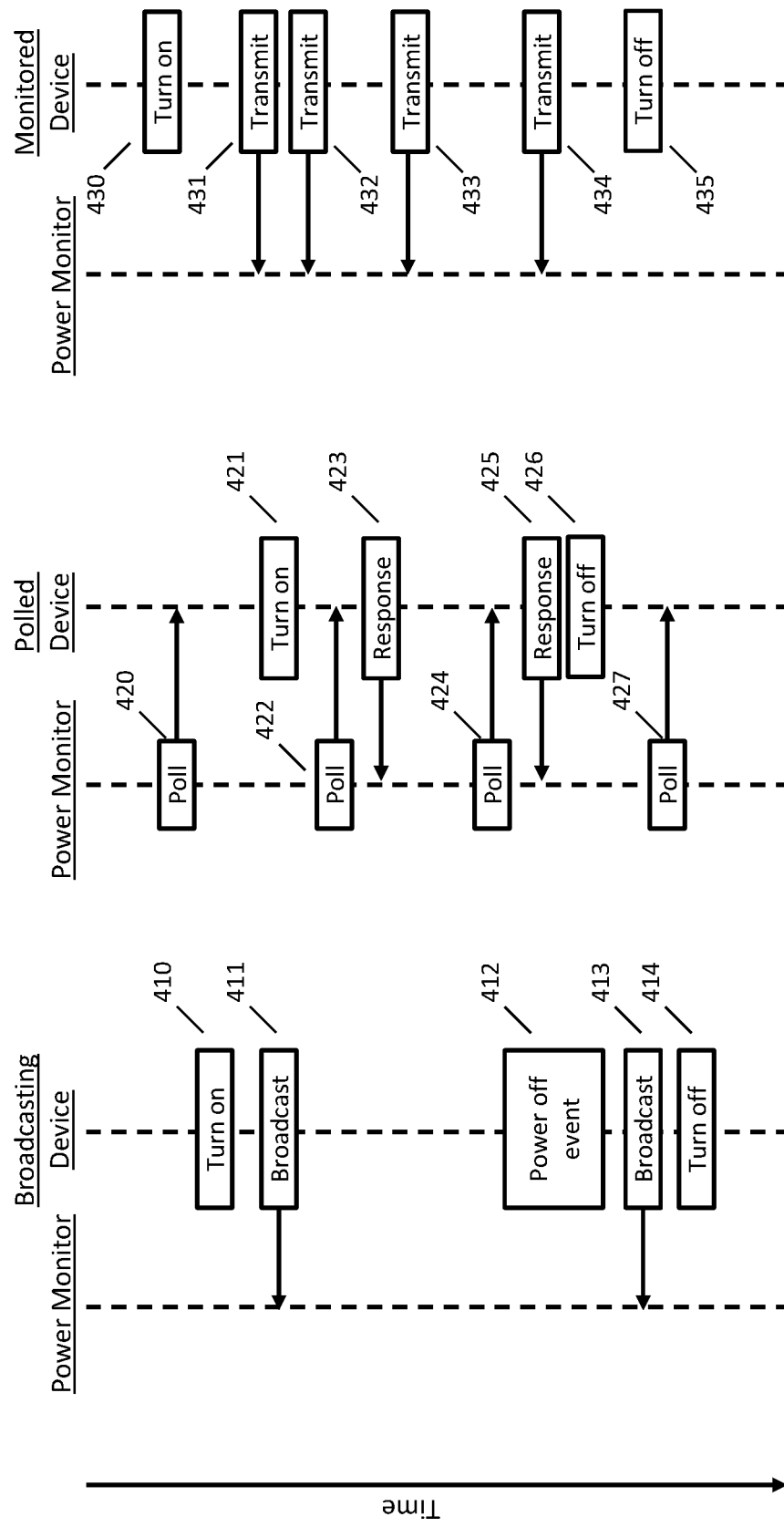
FIGS. 4A, 4B, and 4C illustrate techniques for identifying devices and state changes of devices using network data.

FIG. 4A illustrates an example timeline of power monitor 150 learning information about another device by listening for broadcast messages from the other device (a broadcasting device). Some devices may be configured to broadcast information across a network to announce services or capabilities offered by the device to other devices on the network. For example, a television may provide a service to allow other devices (e.g., phones or personal computers) to stream video content to the television for the television to display, and the television may broadcast a message to the network so that other devices know that this service is available.

In FIG. 4A, a broadcasting device transmits a message to announce availability of a service and later transmits a message to announce withdrawal of the service. In FIG. 4A, time proceeds from top to bottom, and at 410, the broadcasting device is turned on, such as being turned on by a person. The broadcasting device may then announce the services it provides by broadcasting one or more messages on the network at 411, and this message may be received by other devices on the network, including power monitor 150. Later, the broadcasting device may receive a power off event at 412, such as input (e.g., from a person) to turn itself off. After receiving this input, the broadcasting device may broadcast a message that the service is being withdrawn to other devices on the network at 413, and this message may be received by power monitor 150. After broadcasting the message, the broadcasting device may turn off at 414.

Broadcasts are not limited to after a device turns on and before a device turns off, and broadcasts may be used at any time to announce any change in services or to remind other devices on the network that the services are available. For example, a device may broadcast a message before going to sleep or after waking up from being in a sleep mode, to indicate the state of the device, to indicate that the device is in use (e.g., that a song is being played or information about the song being played), or to indicate that a type of media being presented has changed. In some implementations, devices may broadcast messages using simple service discovery protocol (SSDP), zero-configuration networking (zeroconf), or NetBIOS. For example, with SSDP, a device may use multicast addressing to broadcast a message to all devices on the network.

Information from the broadcast messages may be used to identify devices in the house. For example, the messages may include data that may be used to identify the device, such as text describing the device or an identifier. Information from the broadcast messages may also be used to determine the state of the device. For example, announcing the availability of a service may indicate that the device is on and announcing withdrawal of a service may indicate that the device is off. In some implementations, a broadcast message may provide some information about the device, and upon receiving the broadcast message, power monitor 150, may poll the device to obtain additional information about the state of the device. For example, a network speaker system may broadcast that services are available, and power monitor 150 may then poll the network system to find out that it is currently playing music and information about the music being played (e.g., song title, volume, etc.)

FIG. 4B illustrates an example timeline of power monitor 150 learning information about another device by using polling techniques. Power monitor 150 may poll other devices one at a time or may poll multiple devices simultaneously, but for clarity of presentation only one polled device is shown.

At the beginning of the timeline in FIG. 4B, the polled device is in an off state. At 420, power monitor 150 polls the polled device, but since the polled device is in an off state, the polled device does not respond to the poll request. Power monitor 150 may determine that the polled device is in an off state when it does not receive a response to a poll request (or perhaps not receiving a response to multiple poll requests).

At 421, the polled device is turned on, for example by a person. At 422, the power monitor 150 again polls the polled device. Since the polled device is now on, the polled device responds at 423. After receiving a response from the polled device, the power monitor 150 may determine that the polled device has transitioned from an off state to an on state. Poll responses may include information that may be used to determine the state of the device, as described in greater detail below. The poll response may include any of the information described above for broadcast messages.

At 424, the power monitor 150 again polls the polled device, and at 425 the polled device responds to the poll request so the power monitor 150 can determine that the polled device is still in an on state. At 426, the polled device is turned off. At 427, power monitor 150 again polls the polled device and does not receive a response so the power monitor 150 may determine that the polled device is now in an off state.

Any appropriate polling techniques may be used to poll a device. In some implementations, the broadcasting techniques described above may also allow for polling. For example, SSDP may allow a device to poll other devices on the network to determine what services those devices provide, and those devices may respond with messages similar to the broadcast messages described above. In some implementations, lower-level protocol polling may be used, such as internet control message protocol (ICMP) pings or address resolution protocol (ARP) pings.

Information from poll responses may be used to identify devices in the house. For example, poll responses may include data that may be used to identify the device, such as text describing the device or an identifier. Poll responses may also be used to determine the state of the device. For example, a lack of a response to a poll request may indicate that the device is off, a response may indicate that the device is on, and information in the response may provide additional information (e.g., a song that is being played).

FIG. 4C illustrates an example timeline of power monitor 150 learning information about another device by monitoring network data sent by the device to other devices. In some implementations, individual device monitoring may only be used with an explicit opt in by a user or may use only a network packet header (and not the packet body) to avoid collecting too much information or avoid collecting sensitive information.

In FIG. 4C, a monitored device turns on at 430. At 431, 432, 433, and 434, the monitored device transmits data over the network to another device, which may be a device different from power monitor 150. At 435, the monitored device turns off and it stops sending network transmissions. Power monitor 150 may passively receive this network data on the network, such as by passively receiving network packets.

Power monitor 150 may process the received data to determine information about the monitored device. Information in the received data may be used to identify the device, such as text describing the device or an identifier. The received data may also be used to determine the state of the device. For example, the fact that the device is transmitting data indicates that the device is on, and if the device does not transmit any data over a period of time, it may be determined that the device is off.

In some implementations, power monitor 150 may have information about publicly available APIs for third-party devices and use these APIs to determine whether such third-party devices are present in the house. For example, power monitor 150 may periodically send out a request using the Nest thermostat API to determine if a Nest thermostat is present in the house. After it is determined that a Nest thermostat is in the house, it may be polled more frequently to determine the state of the Nest thermostat or the state of the heating/cooling system. The APIs may allow, for example, other devices to determine the temperature of the house, a desired temperature set by a user, or a state of the heating system or cooling system (e.g., whether the furnace is currently active or start and stop times of furnace activity). Querying a device with a specialized API may allow power monitor 150 to determine the state of the device itself (e.g., the Nest thermostat) and other devices that are connected to it (e.g., the furnace).

In some implementations, power monitor 150 may subscribe to notifications transmitted by third-party devices, which are referred to herein as a notifying devices. A notifying device may be configured to transmit notifications to other devices (e.g., periodically or upon a state change) and allow other devices to sign up to receive the notifications using an API. Power monitor 150 may determine that a notifying device is in the house and then subscribe to receive notifications from the device. Power monitor 150 may transmit requests to receive notifications from notifying devices without knowing that the notifying devices are present, and where the notifying devices are present, be subscribed to receive notifications. Some notifying devices may have a pairing procedure that requires assistance of a user, and power monitor 150 may be configured to receive input from a user to assist with the pairing process, such as receiving a user name and password to pair with the notifying device.

Other third-party devices may also provide information about devices they are connected to or that they control, such as a smart switch 340 (e.g., Phillips Hue or Belkin Wemo). A smart switch may have an API to allow other devices to interact with it, and power monitor 150 may use this API to determine a state of the switch, and accordingly whether the device connected to the smart switch is consuming power (e.g., the device is on, the device is off, or a dimmer-type switch is at 40%). Other examples include a smart thermostat that controls a heating or cooling system and may transmit network packets including information about the state of the heating or cooling system; a device that controls lights (e.g., LED lights) and may transmit network packets including information about the state of the lights; a device that controls speakers and may transmit network packets including information about the state of the speakers; a network connected plug or smart plug that controls the flow of power to the device connected to the smart plug and may transmit network packets including information about whether the flow of power is enabled to the connected device or not; or a car charger that charges an electric car and may transmit network packets including information about the amount of power being consumed by the car.

In some implementations, power monitor 150 may receive information about a device in the house via a server external to the house, such as a third-party server that operates in conjunction with a third-party device in the house. Power monitor 150 may operate in conjunction with a power monitor server, and the third-party device in the house may operate in conjunction with the third-party server. For example, a Nest thermostat may send information about the state of the thermostat or the heating/cooling system of the house to a server operated by Nest. The third-party server may allow a user to provide configuration information to cause the third-party server to transmit information to the power monitor server using, for an example, an API of the power monitor server or the third-party server. For example, the Nest server may transmit information received from the Nest thermostat in the house to the power monitor server, such as on a periodic basis or when a state of the thermostat changes (or the state of the heating/cooling system changes). In some implementations, the power monitor server may send requests to the third-party server for information about the third-party device instead of receiving notifications from the third-party server. In some implementations, the third-party device may communicate directly with the power monitor server, or power monitor 150 may communicate directly with the third-party server.

In some implementations, information received in a network transmission from a device may be used to obtain further information about the device. For example, network transmissions may include a unique identifier, such as a media access control (MAC) address. A unique identifier may be used to determine additional information about the device using a data store or repository of information about devices that use the unique identifier. A data store may provide information about the type, make and/or version of the device based in the unique identifier. For example, for MAC addresses, blocks of continuous MAC addresses may be specific to a type of device (e.g., television), manufacturer, or a version of the device (e.g., a particular model of a television). In some implementations, a data store of MAC address information may be available, such as through a third-party service, and information about the device may be obtained using the MAC address. A data store of identifiers may be created, purchased, or accessed (e.g., using a third-party server) to obtain information about the device from the identifier.

In some implementations, user devices, such as a smartphone, may be used to determine information about devices in the house, and the smart phone may relay this information to power monitor 150. For example, speaker 370 (e.g., a portable Bluetooth speaker) may not have a network connection with network device 310 and may instead use another network, such as a Bluetooth network, to communicate with other devices. Speaker 370 may be too far from power monitor 150 such that power monitor may not be able to detect the network of speaker 370. A user device, such as phone 360, may be brought into the same room as speaker 370, and phone 360 may be able to determine that speaker 370 is present and/or an operating state of speaker 370 using a direct network connection. Phone 360 may then relay information about the presence and/or operating state of speaker 370 to power monitor 150 or to a server that works in conjunction with power monitor 150.

In some implementations, network models may be used to identify devices or determine states of devices by processing network data. A network model may include any appropriate mathematical models, such as classifiers, neural networks, self-organizing maps, support vector machines, decision trees, random forests, logistic regression, Bayesian models, linear and nonlinear regression, and Gaussian mixture models. A network model may receive as input data obtained from network transmissions and output identifications of devices or device state changes with an optional score. For example, a network model could receive a broadcast message, information about poll responses received from the device (or lack thereof), or information about network data generated by that device. In some implementations, the network model may receive only headers of network transmissions or may receive all data from the network transmissions.

In some implementations, a network model may be used to identify a device or determine a state of a device using messages broadcast by the device. For example, a device may transmit a certain number and/or type of messages before it turns off and a different number and/or type of messages when going into a sleep mode. A first network model may be created for describing expected messages when a device is about to turn off and a second network model may be created for describing expected messages when a device is about to go into sleep mode. When receiving broadcast messages from the device, the messages may be processed with both network models to generate a score for each network model, and the state transition may be determined by the highest scoring network model.

Network models may also be created to describe other aspects of the network transmissions described above. For example, network models may be created to describe how often a device responds to a poll request and an expected time delay between transmitting the poll request and receiving the response. In another example, a network model may be created that describes expected network transmissions of a device in a particular state, and this network model may be applied when passively monitoring network transmissions of a device.

In some implementations, a rules-based approach may be used to identify devices in the house or determine the states of devices. Power monitor 150 (or a server operating in conjunction with the power monitor) may have rules that have been created for identifying types of devices, makes of devices, or versions of device; rules for determining state changes of devices; and rules for determining other aspects of devices. Rules may be created for any of the techniques described above, such as processing broadcast messages from a device, polling a device, or monitoring network data generated by a device.

Some rules may output a boolean value to indicate whether the conditions of the rule are met or not. For example, a rule may be created to determine whether the device that transmitted the network data is a television, and if the conditions of the rule are satisfied, it is determined that the device is a television. Some rules may output a score, for example, on a scale of 1 to 100, to indicate a match between the network data and the rule. For example, a rule may be created to determine whether the device that transmitted the network data is a television, and a score produced by the rule may be used to make the determination, such as by comparing the score to a threshold or combining the score with other scores as described herein.

Multiple rules may exist for making a determination. For example, multiple rules may exist for determining whether the device that transmitted the network data is a television, and if any one of the rules is satisfied, it may be determined that the device is a television.

Any data in a network transmission or data relating to a network transmission may be use as input into a rule. For example, information extracted from a network transmission (such as a network address, an identifier, a header, a string) may be used as input into a rule. Information that is not in the network transmission but it is related to the network transmission may also be used, such as a time that the network transmission was received.

In some implementations, a rule may comprise one or more conditions that need to be satisfied for the rule to be met. For example, a condition may include any comparison of data, such as inequality, equality, greater than or less than. Rules may employ any combinations of conditions, including but not limited to combinations using Boolean algebra. Examples of rules include the following: a device that broadcasts Zerconf services including AFP, HTTP, and SSH is an Apple Mac OS computer; structured data returned as part of a NetBIOS STATUS poll request provides a user-visible name of a host; a device with a previously-unseen MAC address making a DHCP request is a new device joining the network for the first time; and the vendor of a device is determined using known MAC address vendor prefixes.

In some implementations, device fingerprinting techniques may be used to identify devices on the network. Device fingerprints may be created for known devices, such as a Mac computers, Windows computers, and Linux computers, and possibly different operating system versions of each. A fingerprint may be created by sending multiple requests to each device using, for example, different protocols and port numbers (e.g., using a program such as Nmap). The responses of each device may be recorded to create a fingerprint for each device. Any appropriate data may be used when creating device fingerprints, such as the number and types of network protocols broadcast by the device, broadcast behavior, number or frequency of different types of broadcasts, or parameters used for network transmissions (e.g., a TCP window size).

For an unknown device in the house, similar requests may be sent to that device and the responses may be used to create a fingerprint for the unknown device. The fingerprint for the unknown device may be compared with the fingerprints for the known devices to determine information about the unknown device. For example, if the fingerprint of the unknown device has a closest match with the fingerprint for a Mac laptop, then the unknown device may be identified as a Mac laptop. In some implementations, address resolution protocol (ARP) may be used to identify devices on the network and then each of the identified devices may be fingerprinted using the techniques described above.

Any of the techniques described above for identifying devices or determining device states using network data may generate a score indicating a match between the data and the identified device or state change. For example, applying a rule to a broadcast message may result in a determination that the device is a Toshiba television with a score of 80% or a Sony television with a score of 60%. The scores generated by network models may be combined with scores generated by power models as described in greater detail below.

Combined Power and Network Monitoring

Figures 5, 6:
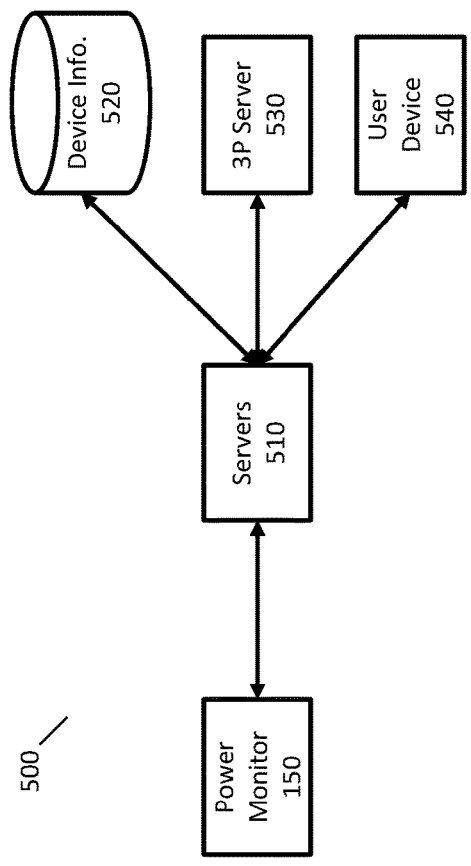
FIG. 5 is an example of a system identifying devices and state changes of devices.
FIG. 6 is an example list of devices.

FIG. 5 illustrates a system 500 for providing users with information about devices in their home using one or both of power monitoring and network monitoring. In FIG. 5, power monitor 150 may have any of the functionality described above. For example, power monitor 150, may identify the existence of devices in the house, may determine states of devices in the house, and may determine power consumption of devices in the house. Power monitor 150 may transmit the information about devices in the home to servers 510 using any known networking techniques. For example, power monitor may have a wireless connection to a router, which in turn connects to servers 510.

Servers 510 may process the information received from power monitor 150 and present information to users, such as through user device 540. Servers 510 may maintain a device list for devices in the home and update the device list with newly identified devices or updated states of devices. Servers 510 may further record a log of device state changes, record a history of power consumption of the house and individual devices, and perform any of the other operations described in U.S. Pat. No. 9,443,195. For performing some operations, servers 510 may access other resources, such as third-party servers 530 and a device information data store 520.

A user may obtain information about devices in the house using user device 540. User device 540 may be any device that provides information to a user including but not limited to phones, tablets, desktop computers, and wearable devices. User device 540 may present, for example, information about device state changes and real-time power usage to the user. For example, user device 540 may present a web page to the user or a special-purpose app may be installed on user device 540. The information presented by user device 540 may include any of the information described in U.S. Pat. No. 9,443,195.

To provide information to users about devices in a home, a list of devices in the home may be maintained. FIG. 6 illustrates an example device list 600. The list of devices may include any information relating to devices in the home, including but not limited to a device ID (which may be particular to the home or all devices known by a company providing the service), a name (e.g., a user supplied name), a type, a make, a version, one or more power models that are used to identify state changes of the device, a network ID (e.g., a network address or other identifier, such as a MAC address), and one or more network models that are used to identify state changes of the device, and a state of the device.

Device list 600 may be stored in one or more locations. For example, device list 600 may be stored at one or more of power monitor 150, servers 510, device information data store 520, or on user device 540. Different versions of the device list may be stored in different locations corresponding to the processing at the location. For example, power monitor 150 may not store the name, type, make, or version of the devices because this information may not be needed to determine device state changes. User device 540 may not store information about power models and network models because user device 540 may not determine any device state changes.

Figure 7:
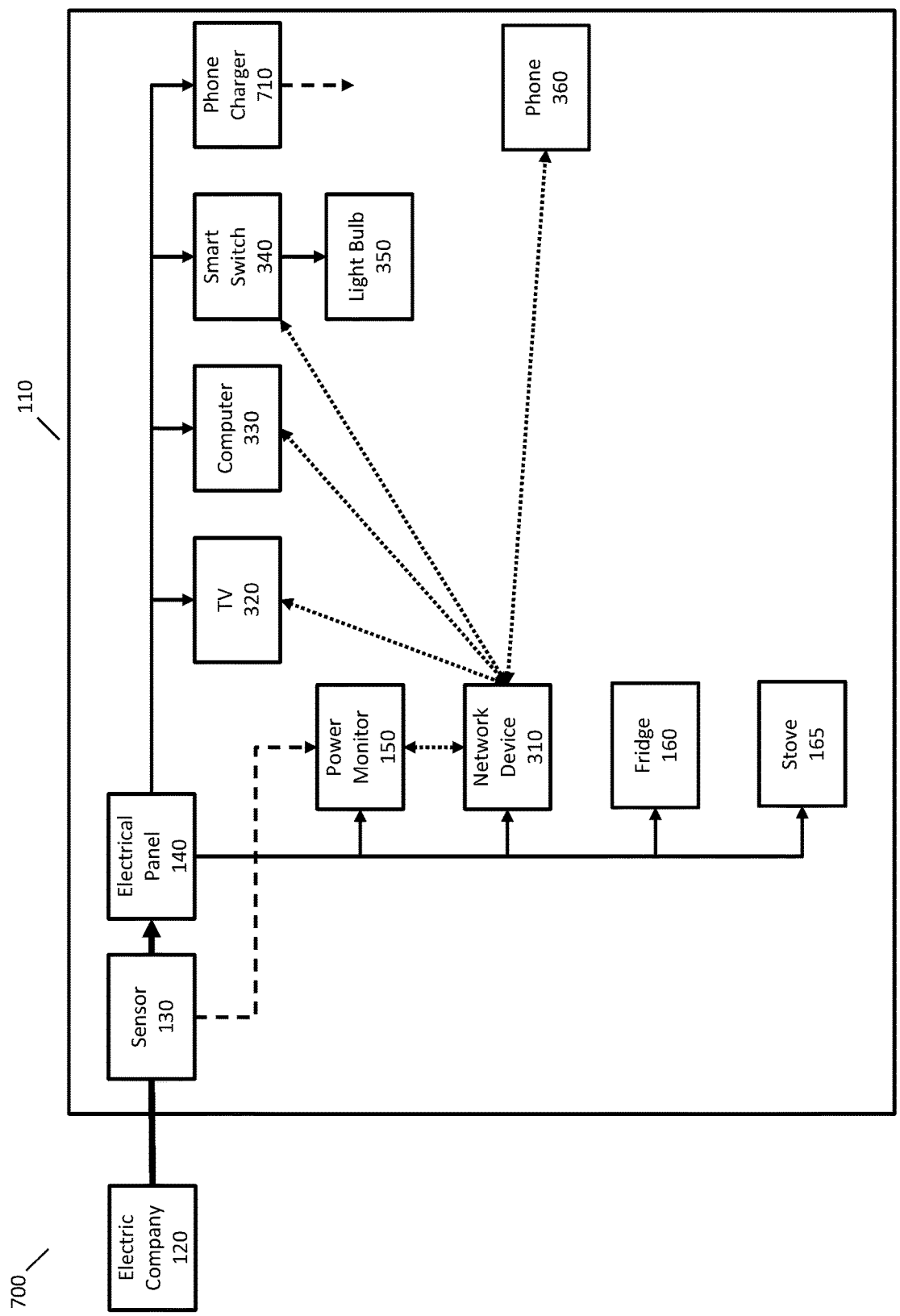
FIG. 7 is an example of a system for identifying devices and state changes of devices using a power monitoring signal and network data.

FIG. 7 illustrates a system 700 with a power monitor 150 that processes a power monitoring signal and network data to identify devices in the home and to identify state changes of devices in the home. As above, house 110 is supplied with power from electric company 120. An electrical panel 140 receives the power and distributes the power to devices in the home. Some devices receive power from electrical panel 140 and are not connected to the network (e.g., refrigerator 160, stove 165, and light bulb 350). Some devices receive power from electrical panel and are connected to the network (e.g., power monitor 150, network device 310, television 320, computer 330, and smart switch 340). Some devices may be connected to the network but not receive power from electrical panel 140 or only sometimes receive power from electrical panel (e.g., phone 360 that may be charged with phone charger 710).

As above, power monitor 150 may receive one or more power monitoring signals from sensor 130 that measures an electrical property of power provided to house 110. Power monitor 150 is also connected to the network in house 110 via network device 310. Power monitor 150 may receive network data from other devices via network device 310 (as indicated by the dotted lines) or may receive network data directly from other devices (not shown in FIG. 7). For some devices in the home, either one or both of power monitoring and network monitoring may be inaccurate or have higher error rates than desired when identifying devices or state changes of devices. By using both power monitoring and network monitoring cooperatively or simultaneously, the performance of identifying devices or state changes of devices may be improved. Simultaneous power monitoring and network monitoring may be implemented using any appropriate techniques, as described in greater detail below, such as combining scores, rules, or voting techniques.

In some implementations, the operations of power monitor 150 may change depending on whether a user is interacting with user device 540 to view information about devices in the house. Where a user is viewing information about devices in the home using user device 540, it may be desired to identify new devices or state changes of devices more quickly than when no users are viewing information about devices in the home.

When a user starts viewing information about devices in the home with user device 540, user device 540 may establish a network connection to servers 510, and servers 510 may transmit information about devices to user device 540. Servers 510 may also have a network connection (either direct or indirect) with power monitor 150. Accordingly, servers 510 may transmit information to power monitor 150 to cause the operations of power monitor 150 to change. Any operations of power monitor 150 may be changed to improve the user experience for the end user. In some implementations, power monitor 150 may change its operations to identify new devices and state changes of new devices more quickly. For example, power monitor may increase a polling frequency used to poll other devices in the house. Where no users are viewing information about devices, a polling frequency of 5 minutes may be sufficient to determine updates. When a user starts viewing information about devices, the polling frequency may be increased (e.g., 10 seconds) to more quickly determine updates.

The arrangement and specific functions of the components of FIG. 5 and FIG. 7 provide just one example of how the techniques described herein may be implemented, but other configurations are possible. For example, power monitor 150 may perform some or all the operations of servers 510, and power monitor 150 may directly provide information to user device 540. In another example, power monitor 150 may include some or all of the functionality of user device 540, and a user may interact directly with power monitor 150 to obtain information about device events and power consumption.

Identifying Devices

When power monitor 150 is first installed in a home, a device list may be created for devices in the home. In some implementations, an empty device list may be created. In some implementations, a device list may be initialized with devices based on input from one or more people in the home. For example, a user may specify any of the types, makes, and/or versions of devices in the house.

Power monitor 150 may use one or both of power monitoring and network monitoring to add or update devices in the device list using any of the techniques described herein. Devices may be added to the device list after they are identified by power monitor, and devices on the device list may be further updated as additional information about them is determined. For example, power monitor 150 may initially determine that the house has a dishwasher, and it may later determine that the house has a Kenmore 1000 dishwasher.

In some implementations, power monitor 150 may add multiple devices to the device list in response to processing a power event in the power monitoring signal. For example, if two power models produce a score above a threshold, then devices corresponding to each power model may be added to the device list. In some implementations, the scores produced by the power models may be included in the device list as well.

Power monitor 150 may also process network data to identify devices in the house and add them to the device list. For example, power monitor 150 may use any of the techniques described above to obtain information about devices connected to a network in the house, and then add devices to the device list for the house.

In some implementations, power monitor 150 may add multiple devices to the device list (optionally with scores) in response to processing a network data transmission. For example, in response to processing a broadcast message, a Toshiba television may be added to the device list with a first score and a Sony television may be added to the device list with a second score.

Scores for devices on the device list may be updated over time. For example, processing a first power event may cause a first device and a second device to be added to the device list with corresponding scores. At a later time, power monitor 150 may process a second power event to generate a second set of scores for the first and second devices. The second set of scores generated using the second power event may be used to update the overall scores for the first and second devices on the device list.

Similarly, network data transmissions at later times may be used to update a score for a device on a device list. For example, a first and second device may be added to a device list with corresponding scores based on processing a first network transmission. At a later time, power monitor 150 may process a second network transmission and generate second scores for the first and second devices. As above, the second set of scores generated using the second network transmission may be used to update the overall scores for the first and second devices on the device list.

In some implementations, a device on a device list may have a score that is generated using both power monitoring and network monitoring. A first device may be added to the device list with a corresponding score after processing a power event. Later, the score for the first device may be updated by processing a first network transmission. An overall score for a device on the device list may be generated by any combination of processing power events and network transmission events.

Scores may be combined using any appropriate techniques. In some implementations, an overall score for a device may be an average of all individual scores generated for that device. In some implementations, a variance may be determined for each of the scores, and the scores may be normalized (e.g., Z-scored) before being combined.

In some implementations, power monitor may simultaneously use both power monitor monitoring and network monitoring to identify devices. For a device that is connected to the electrical line and has a network connection, the device may, around the time of a state change, cause a power event in the power monitoring signal and transmit data over the network (a network event). Power monitor 150 may simultaneously process both the power event and the network event to identify the device.

Figure 8A:
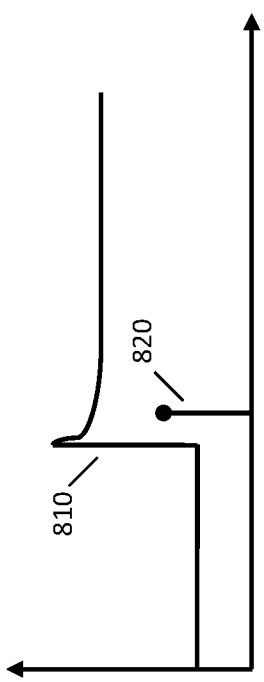
FIGS. 8A and 8B are example timelines of a power monitoring signal and network data.
Figure 8B:
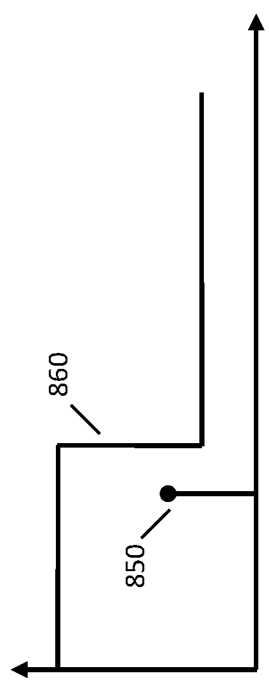

The power event and network event may appear in either order. FIG. 8A illustrates an example where a power event 810 at a first time is followed by a network event 820 at a second time. For example, power event 810 may correspond to the television being turned on and network event 820 may correspond to a broadcast message by the television announcing the availability of services. FIG. 8B illustrates an example where a network event 850 at a first time is followed by a power event 860 at a second time. For example, a user may turn off the television and network event 850 may be a broadcast message withdrawing services and power event 860 may correspond to the television turning off.

When processing a power event, power monitor 150 may look for network events that are temporally close to the power event (e.g., within a time interval, such as within 1 second) and process them simultaneously. For example, power monitor 150 may process network events where the difference between the time of the power event and the time of the network event is less than a threshold. Similarly, when processing a network event, power monitor 150 may look for power events that are temporally close to network event.

In some implementations, power monitor 150 may process a power event and generate scores for corresponding power models. Power monitor 150 may then look for network events that are temporally close to the power event and use information from the network event to adjust the scores generated by the power models. For example, the top two scoring power models may be for a Toshiba television and a Sony television and the scores may be close to each other. A network event may occur shortly after the power event, and the network event may correspond to a Toshiba television. Power monitor 150 may use the network event may to increase the score for identifying a Toshiba television and then identify a Toshiba television and add it to the device list.

A time difference between a power event and a network event may also be used to identify devices. A device may send out a network event with a consistent delay after causing a power event or vice versa. For example, a television turning on may consistently send out a network event (e.g., broadcasting services) at about 3.5 seconds after causing a power event. The timing of the power events and network events may be a feature that may be used with any of the identification techniques described herein.

In some implementations, device identification models may be used that receive both information about a power event and information about a network event as input and then generate scores indicating a match between the input and a device. For example, a device identification model may be created for a type of device, a make of a device, or a version of a device. In some implementations, power monitor 150 may compute a score for each device identification model, select a device identification model having a highest score, and identify the device using the highest scoring device identification model. Device identification models may be created using any appropriate classification techniques, such as neural networks, self-organizing maps, support vector machines, decision trees, random forests, logistic regression, Bayesian models, linear and nonlinear regression, and Gaussian mixture models.

In some implementations, confidence levels may be computed in addition to scores, and the confidence levels may be used in determining whether to add a device to the device list or update information about a device in the device list. For example, where only one score is above a threshold and the score is much higher than all of the other scores, then the confidence level may be high. Where multiple scores are above the threshold, no scores are above the threshold, or the highest score is close to the second highest score, then the confidence may be low. Any appropriate techniques may be used to determine a confidence level for the highest scoring device state change. Where a highest scoring model (e.g., power model, network model, or device identification model) has a low confidence level, the device list may not be updated.

Devices may also be removed from the device list. For example, a user may review the device list and remove devices that are not present in the house. Devices may also be removed from the device list automatically. For example, a device may be removed if it hasn't been identified for longer than a period of time, if an overall score for the device falls below a threshold, or sufficient data has been obtained to distinguish the device from alternative devices (e.g., enough data has been collected to determine with confidence that the television is a Toshiba television and not a Sony Television).

Figure 9:
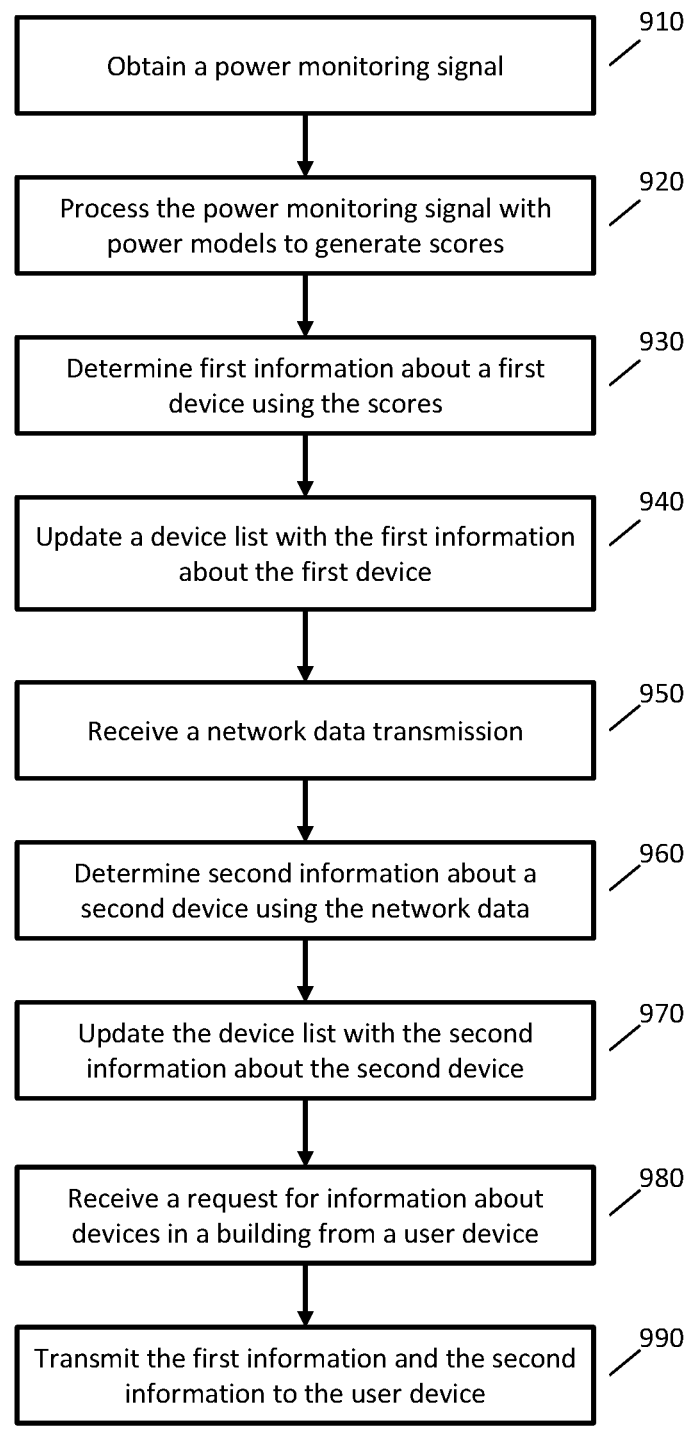
FIG. 9 is a flowchart showing an example implementation of identifying devices using a power monitoring signal and network data.

FIG. 9 is a flowchart illustrating an example implementation of identifying devices in a building. In FIG. 9, the ordering of the steps is exemplary and other orders are possible, not all steps are required and, in some implementations, some steps may be omitted or other steps may be added. The process of the flowcharts may be implemented, for example, by any of the computers or systems described herein.

At step 910, a power monitoring signal is obtained. For example, a power monitoring signal may be obtained by receiving measurements from a sensor that measures an electrical property of a power line in the building, such as a current or voltage sensor. The power line may power some or all of the devices in the building. The power monitoring signal may also be obtained by receiving it from another device. For example, a server may receive a power monitoring signal that is transmitted by a power monitor.

At step 920, the power monitoring signal is processed with a plurality of models to generate a score for each of the models. Each model may have been created for identifying information about devices, such as a type of device, make of device, or version of device. Any appropriate models may be used, such as any of the models described herein. The scores may be any value indicative of a match between the power monitoring signal and the model, such as a likelihood or a log likelihood. Processing the power monitoring signal with the models may be performed by extracting features from the power monitoring signal and then processing the features with the models.

At step 930, first information is determined about a first device in the building using the scores. In some implementations, a highest scoring model may be selected and the first information may be associated with the highest scoring model. For example, a highest scoring model may indicate that the first device is a dishwasher, and the first information may be that the device is a dishwasher. In some implementations, information about network transmissions may be combined with the scores from the power models to determine the first information about the first device as described herein.

At step 940, a device list is updated with the first information about the first device. The device list may be stored in any appropriate location, such as on the power monitor or on a server that operates in conjunction with the power monitor. Where the device list does not yet include any information about the first device, a new entry may be added to the device list with the first information. Where the first device is already on the device list, an entry for the first device may be updated with the first information. For example, where the first information is that the first the device is a Kenmore dishwasher and the device list has an entry for the first device as a dishwasher, the device list may be updated to indicate that the make of the dishwasher is Kenmore. Power monitor may cause the device list to be updated locally or cause the device list to be updated by transmitting the first information to a server to cause the server to update the device list.

At step 950, a network data transmission is received from a second device via a network in the building. The network data transmission may be received directly from the second device (e.g., a point-to-point Bluetooth network) or indirectly from the second device (e.g., via a network router). The network data transmission may take any appropriate format, such as a network packet or Ethernet packet. The network data transmission may be received using any of the techniques described herein, such as receiving a broadcast message in a broadcast network packet, receiving a response to a poll request, or monitoring network transmissions on the network.

At step 960, second information about the second device is determined using the network data transmission. The second information may be determined using data or information in the network packet or other information relating to the network data transmission, such as a time of receipt of the network transmission. In some implementations, the second information may be determined using multiple network transmissions. The second information about the second device may be determined using any of the techniques described herein, such as processing information relating to the network data transmission with rules or network models. In some implementations, the information in or about the network data transmission may be combined with information obtained from power monitoring (e.g., scores from power models) to determine the second information.

At step 970, the device list is updated with the second information about the second device, similar to step 940.

At step 980, a request is received for information about devices in the building. For example, a user may use a user device, such as a smartphone or tablet, to view information about devices in the building. Software running on the user device (e.g., a web page viewed in a browser or a special purpose app) may request information about devices in the building and send a request, for example using a REST API. The request may be received be a server operating in conjunction with power monitor.

At step 990, the first information and second information are transmitted to the user device. For example, the first information may be that the first device is a dishwasher and the second information may be that the second device is a Toshiba television. The information may be transmitted by a server operating in conjunction with the power monitor and the information may be presented by software running on the user device.

In some implementations, devices in a building may be identified as described in the following clauses, combinations of any two or more of them, or in combination with other clauses presented herein.

1. A system for identifying devices in a building, the system comprising at least one computer comprising at least one processor and at least one memory, the at least one computer configured to: obtain a power monitoring signal by measuring an electrical property of a power line in the building, wherein the power line provides power to the devices in the building; process a first power event in the power monitoring signal with a plurality of power models to generate a score for each power model of the plurality of power models, wherein the first power event corresponds to a state change of a first device; determine first information about the first device using the scores; cause the first device to be updated in a device list using the first information about the first device; receive a first broadcast network packet, wherein the first broadcast network packet was sent by a second device; determine, using information in the first broadcast network packet, second information about the second device; cause the second device to be updated in the device list using the second information about the second device; receive a request for information about devices in the building from a user device; and transmit the first information about the first device and the second information about the second device to the user device.

2. The system of clause 1, wherein the first information about the first device comprises a type of the first device, a make of the first device, or a version of the first device.

3. The system of clause 1, wherein the at least one computer is configured to receive a second broadcast network packet, wherein the second broadcast network packet was sent by the first device; and determine the first information about the first device using the plurality of scores and information in the second broadcast network packet.

4. The system of clause 3, wherein a type of the first device is determined using the plurality of scores and a make of the first device is determined using the information in the second broadcast network packet.

5. The system of clause 3, wherein the first power event in the power monitoring signal occurs before receiving the second broadcast network packet.

6. The system of clause 3, wherein the at least one computer is configured to select the second broadcast network packet by comparing a time of the first power event and a time of the second broadcast network packet.

7. The system of clause 1, wherein the at least one computer comprises a power monitor installed in the building and a server computer with a network connection to the power monitor.

8. The system of clause 1, wherein the information in the first broadcast network packet comprises an identifier of the second device and wherein the at least one computer is configured to obtain the second information about the second device from a data store using the identifier of the second device.

9. The system of clause 1, wherein the at least one computer is configured to determine second information about the second device by processing the information in the first broadcast network packet with a plurality of rules, wherein each rule of the plurality of rules comprises comparing information in the network packet to at least one condition.

10. A computer-implemented method for identifying devices in a building, the method comprising: obtaining a power monitoring signal by measuring an electrical property of a power line in the building, wherein the power line provides power to the devices in the building; processing a first power event in the power monitoring signal with a plurality of power models to generate a score for each power model of the plurality of power models, wherein the first power event corresponds to a state change of a first device; determining first information about the first device using the scores; causing the first device to be updated in a device list using the first information about the first device; receiving a first broadcast network packet, wherein the first broadcast network packet was sent by a second device; determining, using information in the first broadcast network packet, second information about the second device; and causing the second device to be updated in the device list using the second information about the second device.

11. The computer-implemented method of clause 10, wherein the power monitoring signal indicates a current or voltage of the power line.

12. The computer-implemented method of clause 10, comprising receiving a plurality of broadcast network packets, wherein each of the plurality of broadcast network packets was sent by the first device; and determining the first information about the first device using the plurality of scores and information in the plurality of broadcast network packets.

13. The computer-implemented method of clause 10, wherein determining the second information about the second device comprises processing the information in the first broadcast network packet with a plurality of network models to generate a second score for each network model of the plurality of network models; and determining the second information about the second device using the second scores for the plurality of network models.

14. The computer-implemented method of clause 10, wherein determining the second information about the second device comprises generating a second score for each identification model of a plurality of identification models, wherein each identification model processes a second power event in the power monitoring signal and the information in the first broadcast network packet; and determining the second information about the second device using the second scores for the plurality of identification models.

15. The computer-implemented method of clause 10, comprising receiving a plurality of broadcast network packets, wherein each broadcast network packet of the plurality of broadcast network packets was sent by the second device; and determining the second information about the second device using the information in the plurality of broadcast network packets.

16. The computer-implemented method of clause 15, wherein determining the second information comprises using a first time corresponding to a first broadcast network packet and a second time corresponding to a second broadcast network packet.

17. One or more non-transitory computer-readable media comprising computer executable instructions that, when executed, cause at least one processor to perform actions comprising: obtaining a power monitoring signal by measuring an electrical property of a power line in the building, wherein the power line provides power to the devices in the building; processing a first power event in the power monitoring signal with a plurality of power models to generate a score for each power model of the plurality of power models, wherein the first power event corresponds to a state change of a first device; determining first information about the first device using the scores; causing the first device to be updated in a device list using the first information about the first device; receiving a first broadcast network packet, wherein the first broadcast network packet was sent by a second device; determining, using information in the first broadcast network packet, second information about the second device; and causing the second device to be updated in the device list using the second information about the second device.

18. The one or more non-transitory computer-readable media of clause 17, wherein determining the first information about the first device comprises selecting a highest scoring power model using the plurality of scores and wherein the first information corresponds to the highest scoring power model.

19. The one or more non-transitory computer-readable media of clause 17, wherein the second information about the second device comprises a type of the second device, a make of the second device, or a version of the second device.

20. The one or more non-transitory computer-readable media of clause 17, wherein the at least one computer is configured to determine second information about the second device by processing the information in the first broadcast network packet with a plurality of rules.

The techniques described above use a combination of power monitoring and network monitoring to provide improved identification of devices in a building over techniques based on only power monitoring. With only power monitoring, some devices may not be able to be identified at all or may be identified but with a lower accuracy. The combination of network monitoring with power monitoring allows a greater number of devices to be identified (such as networked devices without mechanical components) and devices may also be identified with greater accuracy. Using information from both power monitoring and network monitoring allows for the creation of models and/or classifiers with a lower error rate than models and/or classifiers that use only information from power monitoring.

Identifying Device State Changes

In addition to identifying devices in the house, power monitor 150 may also determine the states of devices in the house using one or both of power monitoring and network monitoring. Some devices (e.g., light bulbs) may only have two states, on and off. Other devices may have multiple states. For example, a clothes washer may have a wash cycle, a rinse cycle, and a spin cycle. A television may have an on state, an off state, and a sleep state.

Power monitoring may be used to identify state changes using any of the techniques described herein and in U.S. Pat. No. 9,443,195. For example, power monitor 150 may process the power monitoring signal, select a power model that produced a highest score, determine the device state change from the model, and update the state of the device in the device list.

Network monitoring may also be used to identify state changes using any of the techniques described herein. For example, power monitor may process broadcast messages, poll devices, and monitor device network data to determine the states of devices from their network data as described above.

In some implementations, power monitor may simultaneously use both power monitor monitoring and network monitoring to identify device state changes. For a device that is connected to both the electrical line and a network connection, the device may, around the time of a state change, cause a power event in the power monitoring signal and transmit data over the network (a network event). Power monitor may process both the power event and the network event to identify the state change. The power event and network event may appear in either order as described above.

As above, when processing a power event, power monitor may look for network events that are temporally close to the power event and process them simultaneously. For example, power monitor may process network events where the difference between the time of the power event and the time of the network event is less than a threshold. Similarly, when processing a network event, power monitor may look for power events that are temporally close to network event.

In some implementations, power monitor may process a power event and generate scores for corresponding power models. Power monitor may then look for network events that are temporally close to the power event and use information from the network event to adjust the scores generated by the power models. For example, the top two scoring power models may be a Toshiba television turning on and a computer turning on and the scores may be close to each other. A network event may occur shortly after the power event, and the network event may correspond to a Toshiba television turning on. Power monitor may use the network event may to increase the score for the Toshiba television turning on. For example, the score may be increased by a fixed amount, a percentage, or may be combined with a score generated by the network event processing to generate an overall score for the device state change. Power monitor may then identify the state change as corresponding to the Toshiba television turning on. The timing of power events and network events may also be used as a feature for any of the techniques described herein for determining device state changes.

For some devices, the timing between a device state change and network events may not be precisely known. For example, in some implementations, it may be determined that a device is off when the device has not transmitted any network data for a period of time. It may thus be determined that the device turned off sometime after its last network transmission, but the time it was turned off may not be known. In some implementations, power monitor may process network events to determine a time varying score. For example, where a device's last network transmission was at a first time, power monitor may output a higher score for the time period shortly after the first time and a lower score for later times, such as a score with an exponential decay.

Some devices may have a known rebroadcast window, where the device will rebroadcast at set time intervals the services provided by the device. Where the device has send out a broadcast, but has not sent out another broadcast within the rebroadcast window, it may be determined that the device has been turned off.

In some implementations, state change models may be used that receive both information about a power event and information about a network event as input and then generate scores indicating a match between the input and a device state change. For example, a state change model may be created for each state change of a device (e.g., state changes for a type of device, a make of a device, or a version of a device). In some implementations, power monitor may compute a score for each state change model, select a state change model having a highest score, and identify the state change using the highest scoring state change model. State change models may be created using any appropriate classification techniques, such as neural networks, self-organizing maps, support vector machines, decision trees, random forests, logistic regression, Bayesian models, linear and nonlinear regression, and Gaussian mixture models.

As above, confidence levels may be computed in addition to scores, and the confidence levels may be used in determining whether a state change has occurred. Where a highest scoring model (e.g., power model, network model, or state change model) has a low confidence level, the state change may not be identified.

In determining device state changes, power monitor 150 may use a list of known states of devices and possible transitions between the states of devices. For example, a television may have three states: an on state, an off state, and a sleep state. Because of how the television operates, however, not all state transitions may be possible. For the three states, there are six possible state transitions (on to off, on to sleep, off to on, off to sleep, sleep to on, and sleep to off). From the "off" state, it may only be possible to transition to the "on" state (off to sleep is not possible). From the "sleep" state, it may only be possible to transition to the "on" state (sleep to off is not possible). Accordingly, power monitor may implement techniques (e.g., models or rules) for recognizing all of the possible state changes of devices. When determining a state change of a device, power monitor may select a state change from a list of possible state changes of the device, and the current state may be determined from the ending state of the state change (e.g., when selecting an off to on state change, it is determined that the device is now on). When determining a state of a device, power monitor may select a state from a list of possible states of the device. Power monitor may select state changes or states depending on the implementation and/or the device being monitored.

Any of the techniques described above for identifying devices may also be used for determining state changes of devices. Similarly, any of the techniques described for determining state changes of devices may also be used to identify devices.

Figure 10:
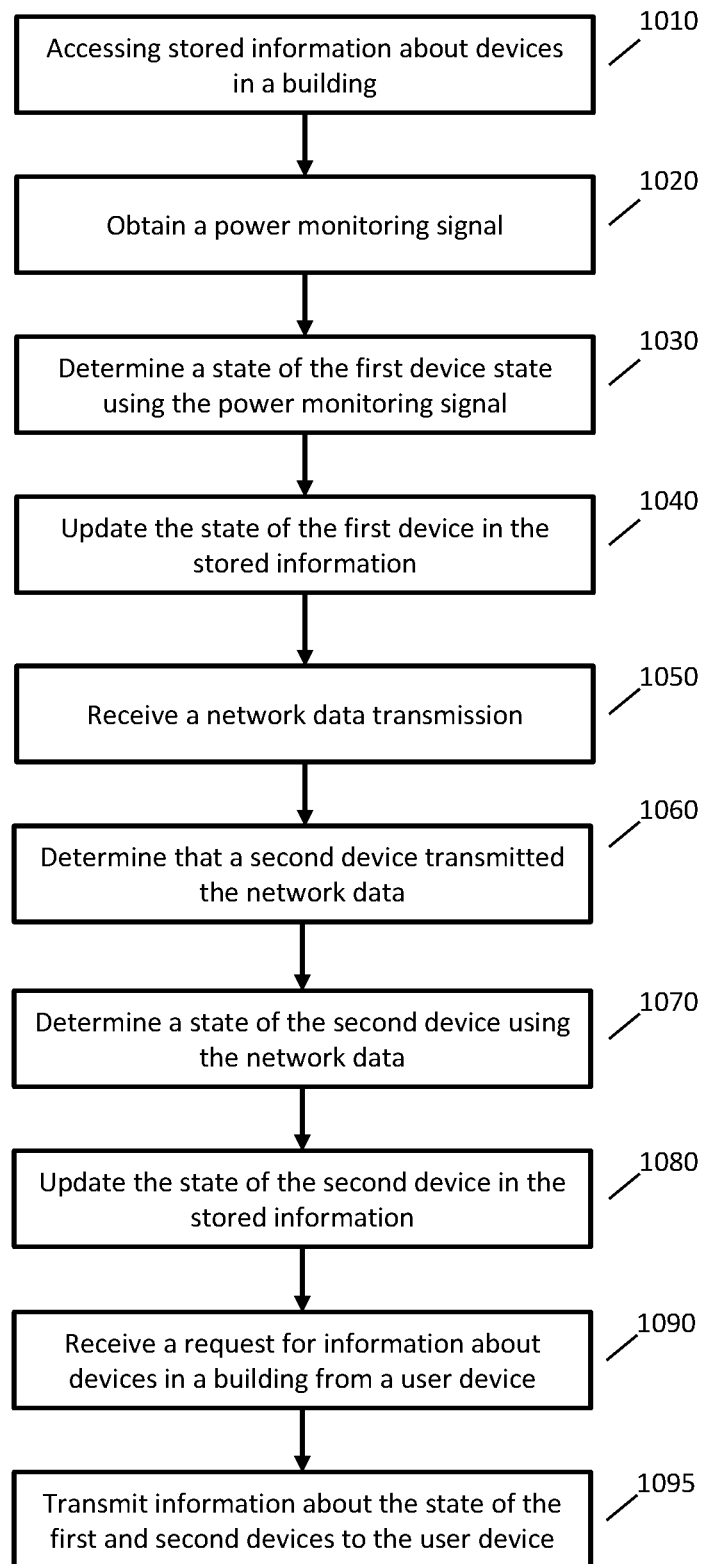
FIG. 10 is a flowchart showing an example implementation of identifying state changes of devices using a power monitoring signal and network data.

FIG. 10 is a flowchart illustrating an example implementation of determining states of devices. In FIG. 10, the ordering of the steps is exemplary and other orders are possible, not all steps are required and, in some implementations, some steps may be omitted or other steps may be added. The process of the flowcharts may be implemented, for example, by any of the computers or systems described herein.

At step 1010, information about devices in a building is accessed from a data store. The information may be stored in any suitable way and stored in any suitable location or multiple locations. For example, power monitor 150 may obtain information about devices in the building from a locally stored device list that includes information about techniques for determining device state changes (e.g., information about models or rules). Power monitor may also access information from a device list stored on a server. The stored information may include information about devices powered by a power line in the building and/or connected to network in the building.

At step 1020, a power monitoring signal is obtained, similar to step 910.

At step 1030, a state of the first device is determined using the power monitoring signal. Any of the techniques described herein may be used to determine the state of the first device, such as computing a plurality of scores using a plurality of power models and selecting a state or state change corresponding to a highest scoring power model. The state or state change of the first device may be selected from a list of possible states or state changes of the first device. In some implementations, network monitoring techniques may not be used to determine the state (even if the first device has a network connection). In some implementations, power monitoring techniques may be combined with network monitoring techniques to determine the state of the first device, for example by using any of the techniques described herein. In some implementations, the state of the first device may be determined by first determining a state change and then determining the state of the first device from the state change.

At step 1040, the state of the first device is updated in the stored information. Any of the techniques described in step 940 for updating a device list may also be used to update the state of the first device in a device list. For example, power monitor may cause the state to be updated in a locally stored device list or transmit information to a server to cause the server to update a device list with the state of the first device.

At step 1050, a network data transmission is received. Any of the techniques described in step 950 may be used to receive a network transmission. In some implementations, a power monitor server operating in conjunction with a power monitor may receive a network data transmission from another server operating in conjunction with a device in the house (e.g., a Nest server operating in conjunction with a Nest thermostat), a power monitor may receive a network data transmission directly from a server operating in conjunction with a device in the house, or a power monitor server may receive a network transmission directly from a device in the house.

At step 1060, it is determined that a second device transmitted the network data. Any appropriate techniques may be used to determine that the second device transmitted the network data, such as using a network address or identifier in the network data to identify the second device as the sender of the network data. Where a power monitor receives network data from the second device via another device, such as a router, the second device may still be considered the sender or transmitter of the network data. Where the network data transmission is received via another server, it may be determined that the network data transmission corresponds to the second device rather than being transmitted by the second device.

At step 1070, a state of the second device is determined using the network data. Any of the techniques described herein may be used to determine the state of the second device using the network data. The state or state change of the second device may be selected from a list of possible states or state changes of the second device. In some implementations, power monitoring techniques may not be used to determine the state (even if the second device receives power from a power line in the building). In some implementations, network monitoring techniques may be combined with power monitoring techniques to determine the state of the second device, for example by using any of the techniques described herein. In some implementations, the state of the second device may be determined by first determining a state change and then determining the state of the second device from the state change.

At step 1080, the state of the second device is updated in the stored information. Any of the techniques described in steps 940 or 1040 for updating a device list may also be used to update the state of the second device in a device list.

At step 1090, a request for information about devices in the building is received. Any of the techniques described in step 980 may be used to request information about devices in the building.

At step 1095, information about the state of the first device and the state of the second device is transmitted to the user device. For example, information may be transmitted to the user device to indicate that the first device is off and that the second device is in a sleep state.

In some implementations, states of devices may be determined as described in the following clauses, combinations of any two or more of them, or in combination with other clauses presented herein.

1. A computer-implemented method for determining states of devices in a building, the method comprising: accessing stored information about devices in the building, wherein the devices in the building comprise a first device and a second device, and wherein the information about the devices comprises a state of the first device and a state of the second device; obtaining a power monitoring signal by measuring an electrical property of a power line in the building, wherein the power line provides power to the devices in the building; determining the state of the first device by (1) processing a first power event in the power monitoring signal with a plurality of power models to generate a score for each power model of the plurality of power models, and (2) selecting a state of the first device from a plurality of possible states using the scores; causing the state of the first device to be updated in the stored information using the selected state; receiving a first broadcast network packet, wherein the first broadcast network was transmitted by the second device; determining, using the information in the first broadcast network packet, that the first broadcast network packet was sent by the second device; selecting, using the information in the first broadcast network packet, the state of the second device from a plurality of possible states for the second device; and causing the state of the second device to be updated in the stored information using the selected state.

2. The computer-implemented method of clause 1, wherein the first broadcast network packet comprises a broadcast using simple service discovery protocol, zero-configuration networking, or NetBIOS.

3. The computer-implemented method of clause 1, the method comprising transmitting a request for information to the second device; and wherein receiving the first broadcast network packet comprises receiving a response to the request for information.

4. The computer-implemented method of clause 3, wherein transmitting the request for information comprises polling the second device, requesting information using an API of the second device, or requesting information about services provided by the second device.

5. The computer-implemented method of clause 1, wherein selecting the state of the second device comprises (1) processing the information in the first broadcast network packet with a plurality of network models, and (2) selecting a highest scoring network model, wherein the highest scoring network model corresponds to the selected state.

6. The computer-implemented method of clause 1, wherein selecting the state of the second device comprises processing the information in the first broadcast network packet with a plurality of rules, wherein each rule of the plurality of rules comprises comparing information in the network packet to at least one condition.

7. The computer-implemented method of clause 1, wherein select the state of the second device comprises: processing a second power event in the power monitoring signal with the plurality of power models to generate a second score for each power model of the plurality of power models; processing the information about the first broadcast network packet with a plurality of network models to generate a third score for each network model of the plurality of network models; and selecting the state using the second scores and the third scores.

8. The computer-implemented method of clause 1, wherein selecting the state of the second device comprises generating a second score for each state change model of a plurality of state change models, wherein each state change model processes a second power event in the power monitoring signal and the information in the first broadcast network packet; and selecting the state using the second scores.

9. The computer-implemented method of clause 1, comprising receiving a plurality of broadcast network packets, wherein each broadcast network packet of the plurality of broadcast network packets was transmitted by the second device; and selecting the state of the second device using information in the plurality of broadcast network packets.

10. A system for determining states of devices in a building, the system comprising at least one computer comprising at least one processor and at least one memory, the at least one computer configured to: store information about devices in the building, wherein the devices in the building comprise a first device and a second device, and wherein the information about the devices comprises a state of the first device and a state of the second device; obtain a power monitoring signal by measuring an electrical property of a power line in the building, wherein the power line provides power to the devices in the building; determine a state of the first device by (1) processing a first power event the power monitoring signal with a plurality of power models to generate a score for each power model of the plurality of power models, and (2) selecting a state of the first device from a plurality of possible states using the scores; cause the state of the first device to be updated in the stored information using the selected state; receive first network data from a server computer, wherein the server computer transmitted the network data based on information received from the second device; determine, using the first network data, that the first network data corresponds to the second device; select, using the first network data, a state of the second device from a plurality of possible states for the second device; and cause the state of the second device to be updated in the stored information using the selected state.

11. The system of clause 10, wherein the at least one computer is configured to cause the state of the first device to be updated in the stored information by transmitting the state of the first device to a server computer.

12. The system of clause 10, wherein the power monitoring signal indicates a current or voltage of the power line.

13. The system of clause 10, wherein the at least one computer comprises a power monitor installed in the building and a server computer with a network connection to the power monitor.

14. The system of clause 13, wherein the server computer is configured to determine that a user device has a network connection with the server computer; the server computer is configured to send an indication to the power monitor that the user device has a network connection with the server computer; and the power monitor is configured to modify its processing in response to receiving the indication.

15. The system of clause 14, wherein the power monitor is configured to modify its processing by changing a frequency of polling devices.

16. The system of clause 10, wherein the at least one computer is configured to select the state of the second device by processing a second power event in the power monitoring signal with the plurality of power models to generate a second score for each power model of the plurality of power models; and selecting the state using the second scores and the information in the first network data.

17. The system of clause 10, wherein the at least one computer is configured to obtain information about power consumption of the second device from a data store of device information using the state of the second device; and transmit the information about power consumption of the second device to a user device.

18. The system of clause 10, wherein the at least one computer is configured to transmit the state of the first device and the state of the second device to a user device.

19. One or more non-transitory computer-readable media comprising computer executable instructions that, when executed, cause at least one processor to perform actions comprising: obtaining a power monitoring signal by measuring an electrical property of a power line in the building, wherein the power line provides power to the devices in the building; determining a state of a first device by (1) processing a first power event in the power monitoring signal with a plurality of power models to generate a score for each power model of the plurality of power models, and (2) selecting a state of the first device from a plurality of possible states using the scores; causing the state of the first device to be updated in a list of devices using the selected state; receiving a first broadcast network packet, wherein the first broadcast network packet was transmitted by a second device; determining, using information in the first broadcast network packet, that the first broadcast network packet was transmitted by the second device; selecting, using the information in the first network event, a state of the second device from a plurality of possible states for the second device; and causing the state of the second device to be updated in the list of devices using the selected state.

20. The one or more non-transitory computer-readable media of clause 19, wherein causing the state of the first device to be updated in the stored information comprises changing the state from an off state to an on state.

21. The one or more non-transitory computer-readable media of clause 19, wherein the plurality of power models comprises one or more of a device model, a transition model, or a wattage model.

22. The one or more non-transitory computer-readable media of clause 19, wherein determining that the first broadcast network packet was transmitted by the second device comprises using a network address or identifier in the first broadcast network packet.

23. The one or more non-transitory computer-readable media of clause 19, wherein processing a first power event in the power monitoring signal with a plurality of power models comprises computing a plurality of features using a portion of the power monitoring signal comprising the first power event; and processing the plurality of features with the plurality of power models.

The techniques described above use a combination of power monitoring and network monitoring to provide improved identification of device state changes in a building over techniques based on only power monitoring. With only power monitoring, some device state changes may not be able to be identified at all or may be identified but with a lower accuracy. The combination of network monitoring with power monitoring allows a greater number of device state changes to be identified (such as state changes of networked devices without mechanical components) and device state changes may also be identified with greater accuracy. Using information from both power monitoring and network monitoring allows for the creation of models and/or classifiers with a lower error rate than models and/or classifiers that use only information from power monitoring.

Devices that Provide Information about Other Devices

Some devices may provide information about other devices that may be used to identify the other devices or identify state changes of the other devices. For example, a smart thermostat may provide identifying information about a heating or cooling system controlled by it or provide information about the state of the heating or cooling system. Other examples of devices that provide information about other devices include smart switches, devices that control lights, devices that control speakers, and car chargers.

Devices that provide information about other devices may transmit network data that includes the information about the other devices. Devices that provide information about other devices will be referred to as transmitting devices. A transmitting device may transmit network data using any of the techniques described herein. For example, a transmitting device may transmit a broadcast network packet, may transmit network data in response to a poll request, or may transmit network data in response to an API call.

Figure 13:
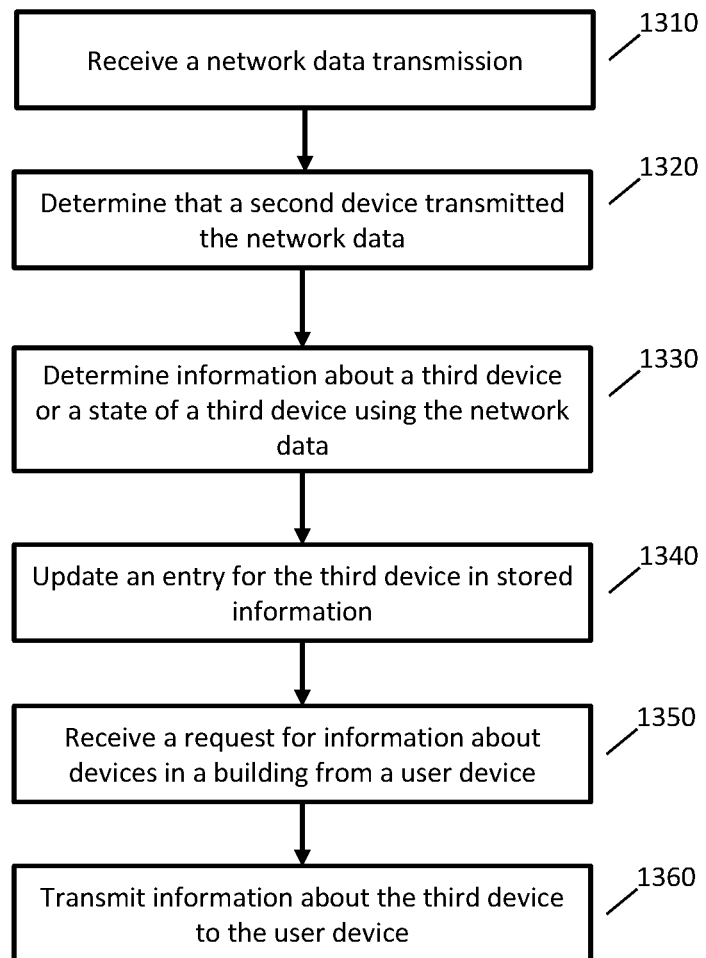
FIG. 13 is a flowchart illustrating an example implementation using network data received from a second device to determine information about a third device or information about a state change of a third device.

FIG. 13 is a flowchart illustrating an example implementation of using network data received from a second device to determine information about a third device or information about a state change of a third device. In FIG. 13, the ordering of the steps is exemplary and other orders are possible, not all steps are required and, in some implementations, some steps may be omitted or other steps may be added. The process of the flowcharts may be implemented, for example, by any of the computers or systems described herein.

At step 1310, a network data transmission is received. Any of the techniques described in step 950 may be used to receive a network transmission. In some implementations, a power monitor server operating in conjunction with a power monitor may receive a network data transmission from another server operating in conjunction with a device in the house (e.g., a Nest server operating in conjunction with a Nest thermostat), a power monitor may receive a network data transmission directly from a server operating in conjunction with a device in the house, or a power monitor server may receive a network transmission directly from a device in the house.

At step 1320, it is determined that a second device transmitted the network data. Any appropriate techniques may be used to determine that the second device transmitted the network data, such as using a network address or identifier in the network data to identify the second device as the sender of the network data. Where a power monitor receives network data from the second device via another device, such as a router, the second device may still be considered the sender or transmitter of the network data. Where the network data transmission is received via another server, it may be determined that the network data transmission corresponds to the second device rather than being transmitted by the second device.

At step 1330, information about a third device or a state change of a third device is determined using the network data. Any of the techniques described herein may be used to determine information about the third device or the state of the third device using the network data. In some implementations, network monitoring techniques may be combined with power monitoring techniques to determine the information about the third device, for example by using any of the techniques described herein.

In some implementations, the determination that the second device transmitted the network data may be used to determine the information about the third device. For example, a mathematical model may be trained specifically for processing network transmissions received from the second device for determining information about the third device or state changes of the third device. For another example, a set of rules may be created specifically for processing network transmissions received from the second device for determining information about the third device or state changes of the third device. Any of the techniques described herein may be used to process network transmissions received from the second device to determine information about the third device.

At step 1340, an entry for the third device is updated in stored information. Where the stored information did not previously include information about the third device, an entry may be added to the stored information for the third device. Updating an entry for the third device may include adding information about the third device (e.g., a type or version of the third device) or adding information about a state change of the third device, such as by using any of the techniques described herein.

At step 1350, a request for information about devices in the building is received. Any of the techniques described in step 980 may be used to request information about devices in the building.

At step 1360, information about the third device or the state of the third device is transmitted to the user device. Any of the techniques described herein, such as at step 990 or step 1095, may be used to transmit information about the third device.

Reporting Power Usage

In some implementations, power monitor may provide users with information about the power consumption of individual devices in the house. For example, for any device where device state changes are determined using power monitoring and/or network monitoring, techniques described in U.S. Pat. No. 9,443,195 may be used to determine power consumption over time for the devices and/or present real-time information about the power consumption of the devices to user.

Some devices in the house may have relatively constant power usage for each state of the device or a power usage that falls within a range. For example, televisions and light bulbs may consume a relatively fixed amount of power when they are on and no power when they are off. For such devices, an expected power consumption or power range may be determined by measuring the power usage of several examples of the devices in each state and computing an average power consumption for the state. A list of expected power usage or power range of the devices may be created for each state and may be available to the power monitor.

When it is determined that a device with relatively constant power usage is in a particular state (e.g., by processing network events), power monitor (or servers operating in conjunction with the power monitor) may obtain an expected power usage or power range for the device state (e.g., from its own storage or a third-party server) and report to the user that the device is consuming the expected amount of power or power within a range. When the device turns off, power monitor may report to the user that the device has stopped consuming power.

Some devices in the house may be "always on." For example, cable modems, wireless routers, smart thermostats, and Internet-of-things devices may be always on. For always on devices, an expected power usage or power range may be determined as described above. After an always on device is identified as being in the house, power monitor may report to the user that the device is always on and provide an expected power usage or power range.

Power monitor (or servers operating in conjunction with the power monitor) may also compute a total amount of energy consumed by devices with relatively constant power usage or devices that are always on. For these devices, a total amount of energy consumed by the device may be calculated by (1) determining the amount of time that the device has been in each of its possible states, (2) determining an expected power usage in each state, (3) determining a total amount of energy consumed in each state by multiplying the amount of time in a state by the expected power consumption for the state, and (4) determining the total amount of energy consumed by the device by adding the energy consumption of each of the states.

Training Power Models Using Network Events

Training power models for some devices may be more challenging than for other devices. Devices with mechanical components, such as pumps and motors, may have power signatures that are easier to identify because of the relationship between the operation of the mechanical components and power usage. Devices with few or without any mechanical components may have power signatures that are more difficult to identify. For example, many electronic devices, such as computers and televisions, may convert alternating current to direct current and then use the direct current to power internal electronics.

Power models may be trained using a training corpus of data as described in U.S. Pat. No. 9,443,195. For example, tens, hundreds, or thousands of examples of a power event in a power signal corresponding to a television being turned on may be used to train a power model for the television turning on. Because the power event corresponding to a television turning on may be similar to power events for other electronic devices turning on, it may be challenging to collect sufficient training data for all the electronic devices in the house.

Network events may be used to assist with collecting training data for training power models for devices that are connected to both the power line and the network. Suppose that it is desired to train a power model for a first device (e.g., a television) turning on. Instances of the first device turning on may be identified by processing network events using any of the techniques described above (e.g., by processing network data transmitted by the first device or by processing network data transmitted by another device that includes information about the first device). Then, a portion of the power monitoring signal corresponding to the first device turning on is stored so that it may later be used for training purposes. The portion of the power monitoring signal may include portions before and/or after the network event. By performing these steps over an extended period of time and/or for multiple homes, a training corpus of training data may be collected for training a power model for the first device turning on.

Any portion of a power monitoring signal may include multiple power events that are close to one another or even overlapping with one another. Accordingly, the collected training data may include power events for other device state changes in addition to power events for the first device turning on. The power events for other devices may be referred to as extraneous power events.

Different approaches may be used for handling the extraneous power events in the training data. In some implementations, no special actions may be taken and the power model may be trained using all of the data as it is. Although the training data will include the extraneous power events, if they are small in number as compared to power events corresponding to the first device turning on, it may not significantly impact the model training. In some implementations, training data with more than one power event may be discarded so that the power model for the first device is trained using only power monitor signal portions containing a single power event. In some implementations, the extraneous power events may be identified so that only power events that are likely to correspond to the first device turning on are used to train the power model. For example, features may be computed for all of the power events in the training data and clustering techniques (e.g., k-means) may be used to identify the extraneous power events. Where a portion of the power monitoring signal contains a power event for the first device turning on at a first time and an extraneous power event at a second time, the power event for the first device turning on may be trained using only a portion of the power monitoring signal that includes the power event at the first time.

A power model for the first device turning on may then be trained using the training data. Any appropriate techniques may be used for training the power model, such as any of the techniques described in U.S. Pat. No. 9,443,195. For example, a power model may include any of a transition model, a device model, or a wattage model. Training techniques may include, but are not limited to, training neural networks, self-organizing maps, support vector machines, decision trees, random forests, logistic regression, Bayesian models, linear and nonlinear regression, and Gaussian mixture models.

Power models may also similarly be trained for other state changes of the first device and state changes of other devices.

Figure 11:
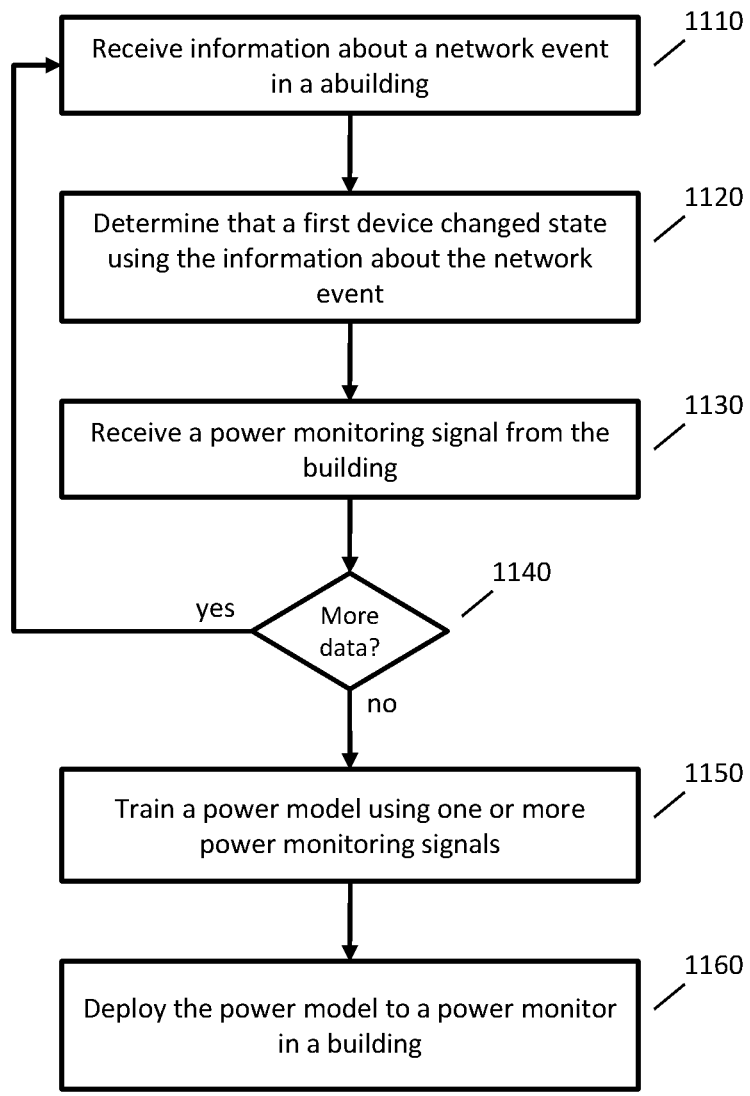
FIG. 11 is a flowchart showing an example implementation training a power model using network data.

FIG. 11 is a flowchart illustrating an example implementation of using network data to train a power model for a device. In FIG. 11, the ordering of the steps is exemplary and other orders are possible, not all steps are required and, in some implementations, some steps may be omitted or other steps may be added. The process of the flowcharts may be implemented, for example, by any of the computers or systems described herein.

At step 1110, information about a first network event in a building is received. A network event may correspond to any transmission of data, such as a network packet transmitted from a device in the building to a power monitor in the building. In some implementations, a server may receive the information about the network event from a power monitor where the power monitor received a network data transmission from another device in the building. The information about the network event may include information in the transmitted network data or information about the transmitted network data, such as a time of receipt. The network event may be associated with a time, such as a time of receipt of the network data by the power monitor.

At step 1120, it is determined that a first device changed state using the information about the network event. The transmission of data corresponding to the network event may have been transmitted by the first device or another device. Any of the techniques described herein may be used to determine that the first device state changed state using the network event. The determination may be performed by a power monitor or by a server operating in conjunction with the power monitor. In some implementations, other steps in the process may be contingent upon determining that the first device changed state. For example, a power monitor may process information about the network event to determine that the first device changed state and only transmit the information about the network event and/or the power monitoring signal (in step 1130) after determining that the first device changed state.

At step 1130, a power monitoring signal is received, where the received power monitoring signal is a portion of a power monitoring signal used by a power monitor. For example, a server may receive the power monitoring signal from the power monitor. The received power monitoring signal may include a measurement taken at a time corresponding to the network event (e.g., a time of transmission or receipt).

Steps 1110, 1120, and 1130 may be repeated any number of times, and corresponding network events and power monitoring signals may be from the same building or may be from multiple buildings. The collected power monitoring signals may correspond to devices sharing a common feature. For example, the power monitoring signals may all be from televisions, may all be from Toshiba televisions, or may be from a particular version of a Toshiba television. Because the power monitoring signals share a common feature, they may be used to train a power model to detect that common feature. At step 1140, it may be determined whether additional data is available or desired for training a power model. If more data is available or desired, then processing may proceed to step 1110. If more data is not available or desired, then processing may proceed to step 1150.

At step 1150, a power model is trained using the power monitoring signals received at one or more instances of step 1130. The power model may be any of the power models described herein or in U.S. Pat. No. 9,443,195 and may be trained using any of the techniques described herein or in U.S. Pat. No. 9,443,195. In some implementations, the power monitoring signals may be processed to identify and remove or ignore extraneous power events corresponding to devices other than the first device, as described herein.

At step 1160, the trained power model may be deployed to a power monitor in a building. For example, the power model may be used by the power monitor to identify devices in the building or identify device state changes in the building using any of the techniques described herein.

In some implementations, power models may be trained as described in the following clauses, combinations of any two or more of them, or in combination with other clauses presented herein.

1. A system for training a power model for identifying devices or device state changes, the system comprising at least one computer comprising at least one processor and at least one memory, the at least one computer configured to: receive information about a first network event, wherein the first network event corresponds to a first device in a first building transmitting data at a first time; determine that the first device changed state using the information about the first network event; obtain a first power monitoring signal, wherein the first power monitoring signal corresponds to a measurement an electrical property of a power line in the first building, and wherein the first power monitoring signal includes a measurement at the first time; receive information about a second network event, wherein the second network event corresponds to a second device in a second building transmitting data at a second time; determine that the second device changed state using the information about the second network event; obtain a second power monitoring signal, wherein the second power monitoring signal corresponds to a measurement an electrical property of a power line in the second building, and wherein the second power monitoring signal includes a measurement at the second time; train a power model using the first power monitoring signal and the second power monitoring signal, wherein the power model is configured to identify a device or a state change of a device using a power monitoring signal; and transmit the power model to a power monitor in a third building.

2. The system of clause 1, wherein the first device and the second device are the same type of device, have the same manufacturer, or have the same version.

3. The system of clause 1, wherein the at least one computer comprises a first power monitor in the first building, a second power monitor in the second building, and a server computer.

4. The system of clause 1, wherein the at least one computer is configured to obtain a third power monitoring signal, wherein the third power monitoring signal corresponds to a measurement an electrical property of a power line in the third building; and process the third power monitoring signal with the power model to determine that a third device changed state.

5. The system of clause 1, wherein the at least one computer is configured to transmit a request for information to the second device; and wherein network data is received in response to the request for information.

6. The system of clause 1, wherein the at least one computer is configured to receive information about a plurality of network events, wherein each network event corresponds to the first device transmitting data; and determine that the first device changed state using the information about the plurality of network events.

7. The system of clause 1, wherein the at least one computer is configured to determine that the first device changed state by (1) processing the information about the first network event with a plurality of network models, and (2) selecting a highest scoring network model.

8. A method for training a power model for identifying devices or device state changes, the method comprising: receiving information about a first network event, wherein the first network event corresponds to a first device transmitting data at a first time; obtaining a first power monitoring signal, wherein the first power monitoring signal corresponds to a measurement an electrical property of a power line, and wherein the first power monitoring signal includes a measurement at the first time; receiving information about a second network event, wherein the second network event corresponds to the first device transmitting data at a second time; obtaining a second power monitoring signal, wherein the second power monitoring signal corresponds to a measurement an electrical property of the power line, and wherein the second power monitoring signal includes a measurement at the second time; training a power model using the first power monitoring signal and the second power monitoring signal, wherein the power model is configured to identify the first device or a state change of the first device using a power monitoring signal.

9. The method of clause 8, comprising determining that the first device changed state using the information about the first network event; and determining that the second device changed state using the information about the second network event.

10. The method of clause 8, comprising transmitting the power model to a power monitor in a building.

11. The method of clause 8, wherein the first network event comprises a broadcast network packet.

12. The method of clause 8, wherein the information about the first network event comprises a time of the first network event.

13. The method of clause 8, comprising determining that the first power monitoring signal comprises a first power event and a second power event; determining that the first power event corresponds to the first device changing state; and training the power model using the first power event.

14. The method of clause 13, wherein determining that the first power event corresponds to the first device comprises computing first features for the first power event and second features for the second power event; and processing the first features and the second features with a mathematical model or clustering the first features and second features.

15. The method of clause 13, wherein the first device is in a first building and the method comprising receiving information about a third network event, wherein the third network event corresponds to a second device in a second building transmitting data at a third time; obtaining a third power monitoring signal, wherein the third power monitoring signal corresponds to a measurement an electrical property of a power line in the second building, and wherein the second power monitoring signal includes a measurement at the third time; and training the power model using the third power monitoring signal.

16. One or more non-transitory computer-readable media comprising computer executable instructions that, when executed, cause at least one processor to perform actions comprising: receiving information about a first network event, wherein the first network event corresponds to a first device transmitting data at a first time; obtaining a first power monitoring signal, wherein the first power monitoring signal corresponds to a measurement an electrical property of a power line, and wherein the first power monitoring signal includes a measurement at the first time; receiving information about a second network event, wherein the second network event corresponds to the first device transmitting data at a second time; obtaining a second power monitoring signal, wherein the second power monitoring signal corresponds to a measurement an electrical property of the power line, and wherein the second power monitoring signal includes a measurement at the second time; training a power model using the first power monitoring signal and the second power monitoring signal, wherein the power model is configured to identify the first device or a state change of the first device using a power monitoring signal.

17. The one or more non-transitory computer-readable media of clause 16, wherein the power monitoring signal indicates a current or voltage of the power line.

18. The one or more non-transitory computer-readable media of clause 16, wherein the power model comprises a transition model, a device model, or a wattage model.

19. The one or more non-transitory computer-readable media of clause 16, wherein the first network event comprises a broadcast network packet.

20. The one or more non-transitory computer-readable media of clause 16, comprising transmitting the power model to a power monitor in a building.

The techniques described above allow for the creation of power models for devices where it may otherwise be difficult to obtain sufficient training data to train a power model. For devices with few or without any mechanical components (e.g., televisions and computers), there may not be a lot of variability in the power signatures of the devices. To obtain an example power signature for such devices, one could manually change the state of the device and save the power monitoring signal in a window around the manual state change, but this process does not scale for obtaining a large amount of training data or obtaining data for a large number of devices. By applying the techniques described herein, training data for devices can be obtained through network monitoring. Because this process may not require action by a person, it may thus scale to obtain a large amount of training data and/or training data for a large number of devices. By obtaining training data using network monitoring, power models may be created more quickly (since the training data may be obtained more quickly) and the power models may be more accurate (since more training data may be available).

Implementation

Figure 12:
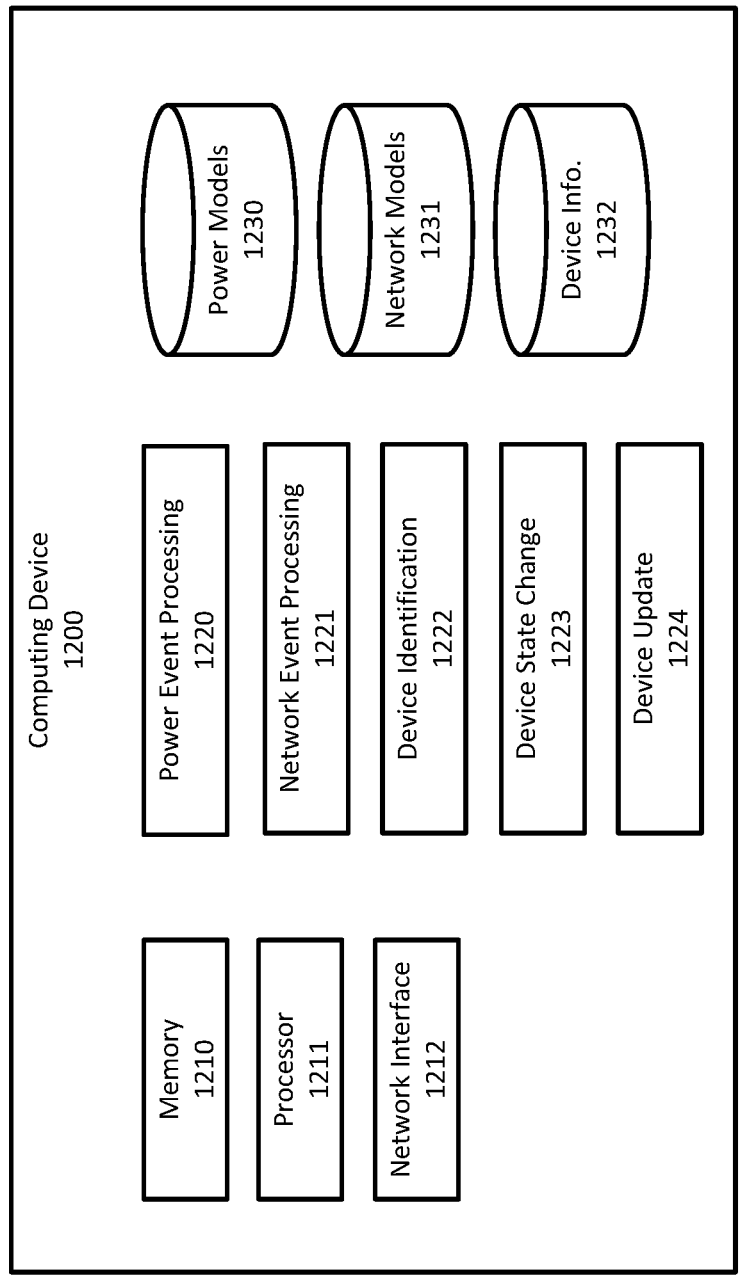
FIG. 12 is an example of a device for identifying devices and state changes of devices using a power monitoring signal or network data.

FIG. 12 illustrates components of some implementations of a computing device 1200 that may be used for any of a power monitor or a server that operates in conjunction with a power monitor. In FIG. 12 the components are shown as being on a single computing device, but the components may be distributed among multiple computing devices, such as among any of the devices mentioned above or among several server computing devices.

Computing device 1200 may include any components typical of a computing device, such as one or more processors 1211, volatile or nonvolatile memory 1210, and one or more network interfaces 1212 for connecting to computer networks. Computing device 1200 may also include any input and output components, such as displays, keyboards, and touch screens. Computing device 1200 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1200 may include a power event processing component 1220 that may be used to process power monitoring signals and determine information about devices from the power monitoring signals, such as identifying devices and device state changes. Computing device 1200 may include a network event processing component 1221 that may be used to process data from a computer network and determine information about devices from the network data, such as identifying devices and device state changes. Computing device 1200 may include a device identification component that may be used to identify information about devices (such as a type of device or make of the device) by using information obtained from power monitoring and/or network monitoring. Computing device 1200 may include a device state change component that may be used to identify state changes of device by using information obtained from power monitoring and/or network monitoring. Computing device 1200 may have a device update component 1224 that may be used to update a list of devices after devices have been identified or state changes of devices have been identified.

Computing device 1200 may include or have access to various data stores, such as data stores 1230, 1231, and 1232. Data stores may use any known storage technology such as files or relational or non-relational databases. For example, computing device 1200 may have a power models data store 1230 to store power models or information about power models. Computing device 1200 may have a network models data store 1231 to store network models or information about network models. Computing device 1200 may have a device information data store 1232 that may be used to store information about devices, such as device lists for one or more buildings.

While only a few embodiments of the present invention have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

All documents referenced herein are hereby incorporated by reference.

What is claimed is:

1. A computer-implemented method for determining states of devices in a building, the method comprising:
obtaining a power monitoring signal by measuring an electrical property of a power line in the building, wherein the power line provides power to the devices in the building, the devices in the building comprising a first device, a second device, and a third device;
determining a state of the first device by (1) processing a first power event in the power monitoring signal with a plurality of power models to generate a score for each power model of the plurality of power models, and (2) selecting the state of the first device from a plurality of possible states for the first device using the scores;
receiving a first network packet, wherein the first network packet was transmitted by the second device;
determining, using information in the first network packet, that the first network packet was sent by the second device; and
selecting, using the information in the first network packet, a state of the third device from a plurality of possible states for the third device.

2. The computer-implemented method of claim 1, wherein:
the second device is a thermostat and the third device is a heating or cooling system;
the second device is a smart plug and the third device is plugged into the smart plug;
the second device is a car charger and the third device is an electric car;
the second device controls one or more lights and the third device is a light; or
the second device controls one or more speakers and the third device is a speaker.

3. The computer-implemented method of claim 1, comprising:
transmitting a request for information to the second device; and
wherein receiving the first network packet comprises receiving a response to the request for information.

4. The computer-implemented method of claim 3, wherein transmitting the request for information comprises polling the second device, requesting information using an API of the second device, or requesting information about services provided by the second device.

5. The computer-implemented method of claim 1, wherein selecting the state of the third device comprises (1) processing the information in the first network packet with a plurality of network models, and (2) selecting a highest scoring network model, wherein the highest scoring network model corresponds to the selected state of the third device.

6. The computer-implemented method of claim 1, wherein selecting the state of the third device comprises processing the information in the first network packet with a plurality of rules, wherein each rule of the plurality of rules comprises comparing information in the first network packet to at least one condition.

7. The computer-implemented method of claim 1, wherein selecting the state of the third device comprises:
processing a second power event in the power monitoring signal with the plurality of power models to generate a second score for each power model of the plurality of power models;
processing the information about the first network packet with a plurality of network models to generate a third score for each network model of the plurality of network models; and
selecting the state of the third device using the second scores and the third scores.

8. The computer-implemented method of claim 1, wherein selecting the state of the third device comprises:
generating a second score for each state change model of a plurality of state change models, wherein each state change model processes a second power event in the power monitoring signal and the information in the first network packet; and
selecting the state of the third device using the second scores.

9. The computer-implemented method of claim 1, comprising:
receiving a plurality of network packets, wherein each network packet of the plurality of network packets was transmitted by the second device; and
selecting the state of the third device using information in the plurality of network packets.

10. A system for determining states of devices in a building, the system comprising:
at least one computer comprising at least one processor and at least one memory, the at least one computer configured to:
obtain a power monitoring signal by measuring an electrical property of a power line in the building, wherein the power line provides power to the devices in the building, including a first device, a second device, and a third device;
determine a state of the first device by (1) processing a first power event the power monitoring signal with a plurality of power models to generate a score for each power model of the plurality of power models, and (2) selecting a state of the first device from a plurality of possible states for the first device using the scores;
receive first network data from a server computer, wherein the server computer transmitted the first network data based on information received from the second device;
determine, using the first network data, that the first network data corresponds to the second device; and
select, using the first network data, a state of the third device from a plurality of possible states for the third device.

11. The system of claim 10, wherein the at least one computer is configured to transmit the state of the first device to a second server computer.

12. The system of claim 10, wherein the power monitoring signal indicates a current or voltage of the power line.

13. The system of claim 10, wherein the at least one computer is configured to select the state of the third device by:
processing a second power event in the power monitoring signal with the plurality of power models to generate a second score for each power model of the plurality of power models; and
selecting the state of the third device using the second scores and the information in the first network data.

14. The system of claim 10, wherein the at least one computer is configured to:
obtain information about power consumption of the third device from a data store of device information using the state of the third device; and
transmit the information about the power consumption of the third device to a user device.

15. The system of claim 10, wherein the at least one computer is configured to:
- transmit the state of the first device and the state of the third device to a user device.

16. The system of claim 10, wherein the at least one computer comprises a power monitor installed in the building and a second server computer with a network connection to the power monitor.

17. The system of claim 16, wherein:
- the second server computer is configured to determine that a user device has a network connection with the second server computer;
- the second server computer is configured to send an indication to the power monitor that the user device has a network connection with the second server computer; and
- the power monitor is configured to modify its processing in response to receiving the indication.

18. The system of claim 17, wherein the power monitor is configured to modify its processing by changing a frequency of polling devices.

19. One or more non-transitory, computer-readable media comprising computer executable instructions that, when executed, cause at least one processor to perform actions comprising:
- obtaining a power monitoring signal by measuring an electrical property of a power line in a building, wherein the power line provides power to devices in the building, including a first device, a second device, and a third device;
- determining a state of the first device by (1) processing a first power event in the power monitoring signal with a plurality of power models to generate a score for each power model of the plurality of power models, and (2) selecting a state of the first device from a plurality of possible states for the first device using the scores;
- receiving a first network packet, wherein the first network packet was transmitted by the second device;
- determining, using information in the first network packet, that the first network packet was transmitted by the second device; and
- selecting, using the information in the first network packet, a state of the third device from a plurality of possible states for the third device.

20. The one or more non-transitory, computer-readable media of claim 19, the actions comprising transmitting, to a server computer, information about the state of the first device and the state of the third device.

21. The one or more non-transitory, computer-readable media of claim 19, wherein the plurality of power models comprises one or more of a device model, a transition model, or a wattage model.

22. The one or more non-transitory, computer-readable media of claim 19, wherein determining that the first network packet was transmitted by the second device comprises using a network address or identifier in the first network packet.

23. The one or more non-transitory, computer-readable media of claim 19, wherein processing the first power event in the power monitoring signal with the plurality of power models comprises:
- computing a plurality of features using a portion of the power monitoring signal comprising the first power event; and
- processing the plurality of features with the plurality of power models.

* * * * *

UNITED STATES PATENT AND TRADEMARK OFFICE
CERTIFICATE OF CORRECTION

PATENT NO. : 10,750,252 B2  
APPLICATION NO. : 16/054535  
DATED : August 18, 2020  
INVENTOR(S) : Jonah Wyman Petri et al.

Page 1 of 1

It is certified that error appears in the above-identified patent and that said Letters Patent is hereby corrected as shown below:

On the Page 3, in Column 1, under "Other Publications", Line 8, delete "/parker" and insert -- /barker --, therefor.

On the Page 3, in Column 1, under "Other Publications", Line 40, delete "Figueuredo," and insert -- Figueiredo, --, therefor.

On the Page 4, in Column 1, under "Other Publications", Line 8, delete "PCT/US19/54602," and insert -- PCT/US19/54062, --, therefor.

Signed and Sealed this  
First Day of December, 2020

Andrei Iancu  
*Director of the United States Patent and Trademark Office*